(12) United States Patent
Smith

(10) Patent No.: US 11,803,692 B2
(45) Date of Patent: Oct. 31, 2023

(54) ELECTRONIC PUBLISHING PLATFORM

(71) Applicant: 21 Entertainment LLC, Las Vegas, NV (US)

(72) Inventor: Mario C. Smith, Playa Vista, CA (US)

(73) Assignee: 21 Entertainment LLC, Beverly Hills, CA (US)

(*) Notice: Subject to any disclaimer, the term of this patent is extended or adjusted under 35 U.S.C. 154(b) by 0 days.

(21) Appl. No.: 18/151,188

(22) Filed: Jan. 6, 2023

(65) Prior Publication Data

US 2023/0252221 A1 Aug. 10, 2023

Related U.S. Application Data

(63) Continuation of application No. 17/584,305, filed on Jan. 25, 2022, now Pat. No. 11,599,705, which is a
(Continued)

(51) Int. Cl.
*G06F 40/106* (2020.01)
*G06F 3/0483* (2013.01)
(Continued)

(52) U.S. Cl.
CPC .......... *G06F 40/106* (2020.01); *G06F 3/0483* (2013.01); *G06F 3/04845* (2013.01);
(Continued)

(58) Field of Classification Search
CPC ........ G06F 21/64; G06F 16/27; G06F 21/602; G06F 21/6218; G06F 16/2471; G06F 21/6227; G06F 21/6245; G06F 16/22; G06F 16/2272; G06F 16/245; G06F 16/2455; G06F 16/9014; G06F 21/604; G06F 2221/2141; G06F 16/2246; G06F 16/248; G06F 2221/2107; G06F 11/0775; G06F 11/079; G06F 11/1448; G06F 11/3006; G06F 11/327; G06F 16/113;
(Continued)

(56) References Cited

U.S. PATENT DOCUMENTS

2005/0055632 A1 3/2005 Schwartz et al.
2007/0282673 A1 12/2007 Nagpal et al.
(Continued)

OTHER PUBLICATIONS

Schule. "Provide, obtain and exchange information: the e-publishing technology information 1-14 platform CARPET." Insights 25.3 (2012). Nov. 5, 2012 (Nov. 5, 2012) from <https://insights.uksg.org/articles/10 .1629/2048-7754.25.3.305/> entire document.

*Primary Examiner* — Rayeez R Chowdhury
(74) *Attorney, Agent, or Firm* — Perkins Coie LLP; Colin Fowler; Michael Glenn

(57) ABSTRACT

Disclosed herein is a web user experience improvement for digital magazines. A digital magazine viewing platform is integrated with a digital magazine publishing platform including features that leverage the integration including user interface arrangement based on viewing habits and ripped content that is insertable into draft digital magazine documents. In some embodiments, a machine learning model categorizes magazine styles and present publishing features based on those magazines viewed or subscribed to by a given user.

18 Claims, 27 Drawing Sheets

Related U.S. Application Data continuation-in-part of application No. 17/175,458, filed on Feb. 12, 2021, now Pat. No. 11,281,844.

(60) Provisional application No. 63/018,283, filed on Apr. 30, 2020.

(51) Int. Cl.
  *G06T 13/80* (2011.01)
  *H04L 9/32* (2006.01)
  *G06F 40/114* (2020.01)
  *G06F 40/197* (2020.01)
  *G06F 40/166* (2020.01)
  *G06F 3/04845* (2022.01)

(52) U.S. Cl.
  CPC .......... *G06F 40/114* (2020.01); *G06F 40/166* (2020.01); *G06F 40/197* (2020.01); *G06T 13/80* (2013.01); *H04L 9/3213* (2013.01)

(58) Field of Classification Search
  CPC .... G06F 16/137; G06F 2113/10; G06F 30/27; G06F 16/182; G06F 16/2462; G06F 9/5055; G06F 9/451
  See application file for complete search history.

(56) References Cited

U.S. PATENT DOCUMENTS

| | | |
|---|---|---|
| 2008/0082903 A1 | 4/2008 | McCurdy et al. |
| 2008/0222552 A1 | 9/2008 | Batarseh et al. |
| 2008/0282171 A1 | 11/2008 | Katz et al. |
| 2010/0057566 A1 | 3/2010 | Itzhak |
| 2011/0026839 A1 | 2/2011 | Bogart et al. |
| 2012/0231441 A1 | 9/2012 | Parthasarathy et al. |
| 2013/0145257 A1 | 6/2013 | Shalabi et al. |
| 2014/0214503 A1 | 7/2014 | Chircorian |
| 2015/0019943 A1 | 1/2015 | Ying et al. |
| 2015/0143256 A1* | 5/2015 | Panchawagh-Jain ........ G06Q 10/10 715/752 |
| 2015/0242374 A1* | 8/2015 | Kong .............. G06F 40/106 715/201 |

\* cited by examiner

ELECTRONIC PUBLISHING PLATFORM

CROSS REFERENCE

This application is a continuation of U.S. patent application Ser. No. 17/584,305, filed Jan. 25, 2022, which is a continuation-in-part of U.S. patent application Ser. No. 17/175,458, filed Feb. 12, 2021, now U.S. Pat. No. 11,281,844, which claims the benefit of U.S. Provisional Application No. 63/018,283, filed Apr. 30, 2020, which are incorporated herein by reference in their entireties.

TECHNICAL FIELD

Various of the disclosed embodiments concern an electronic publishing platform of page-based media.

BACKGROUND

On-line content is readily available. For example, digital magazine publishing applications exist (e.g., Issuu) and provide an electronic publishing platform with some basic features. Additionally, there are basic digital magazine viewers (e.g., Zinio) that provide some basic multi-platform distribution service for digital magazines. These services, and others, offer some basic features in isolation and there is a need for improvements to existing platforms.

BRIEF DESCRIPTION OF THE DRAWINGS

One or more embodiments of the present disclosure are illustrated by way of example and not limitation in the figures of the accompanying drawings, in which like references indicate similar elements.

FIG. 9 shows a second user interface and user experience design for main landing page;

Figure 22:
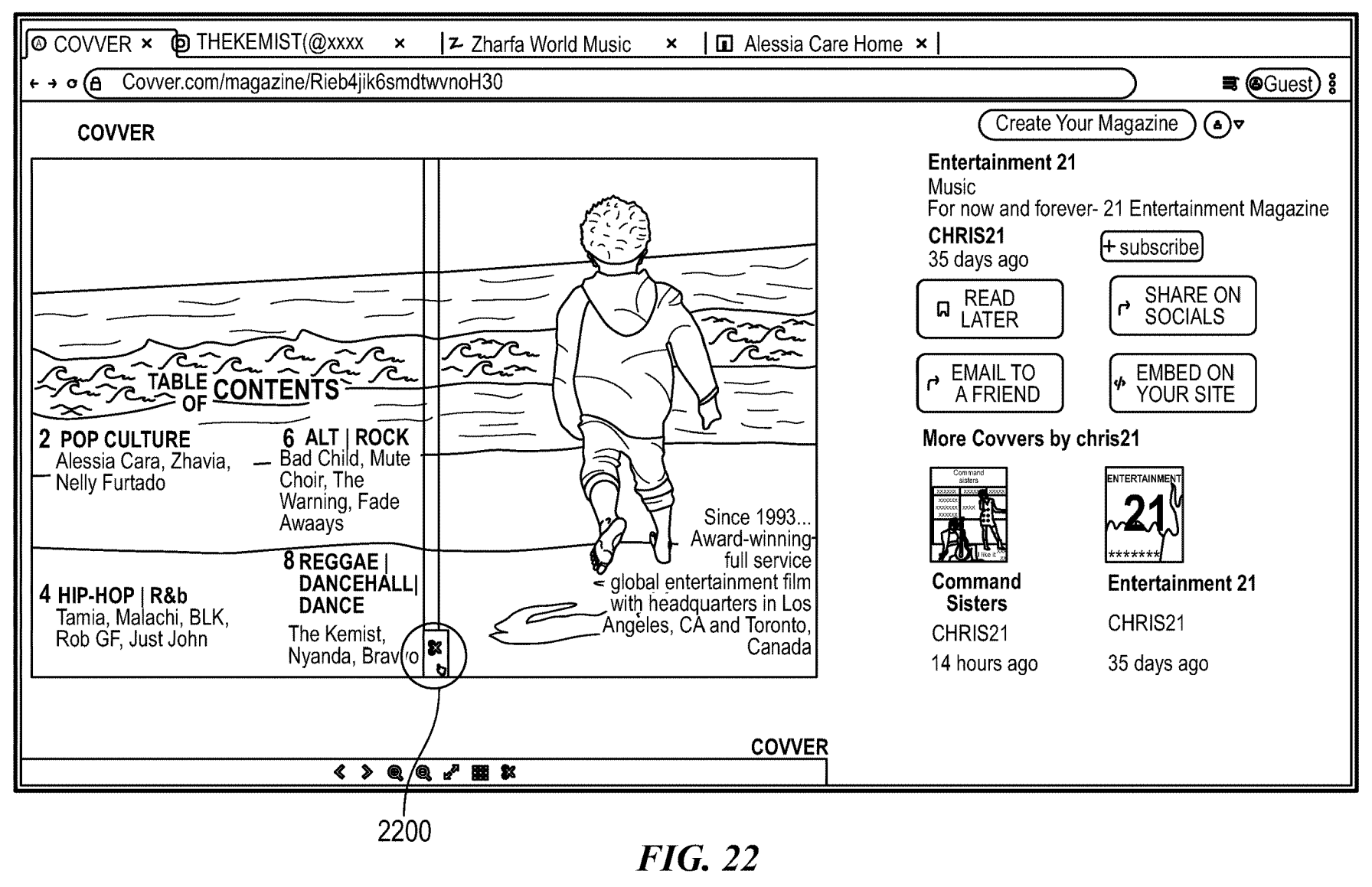
Figure 23:
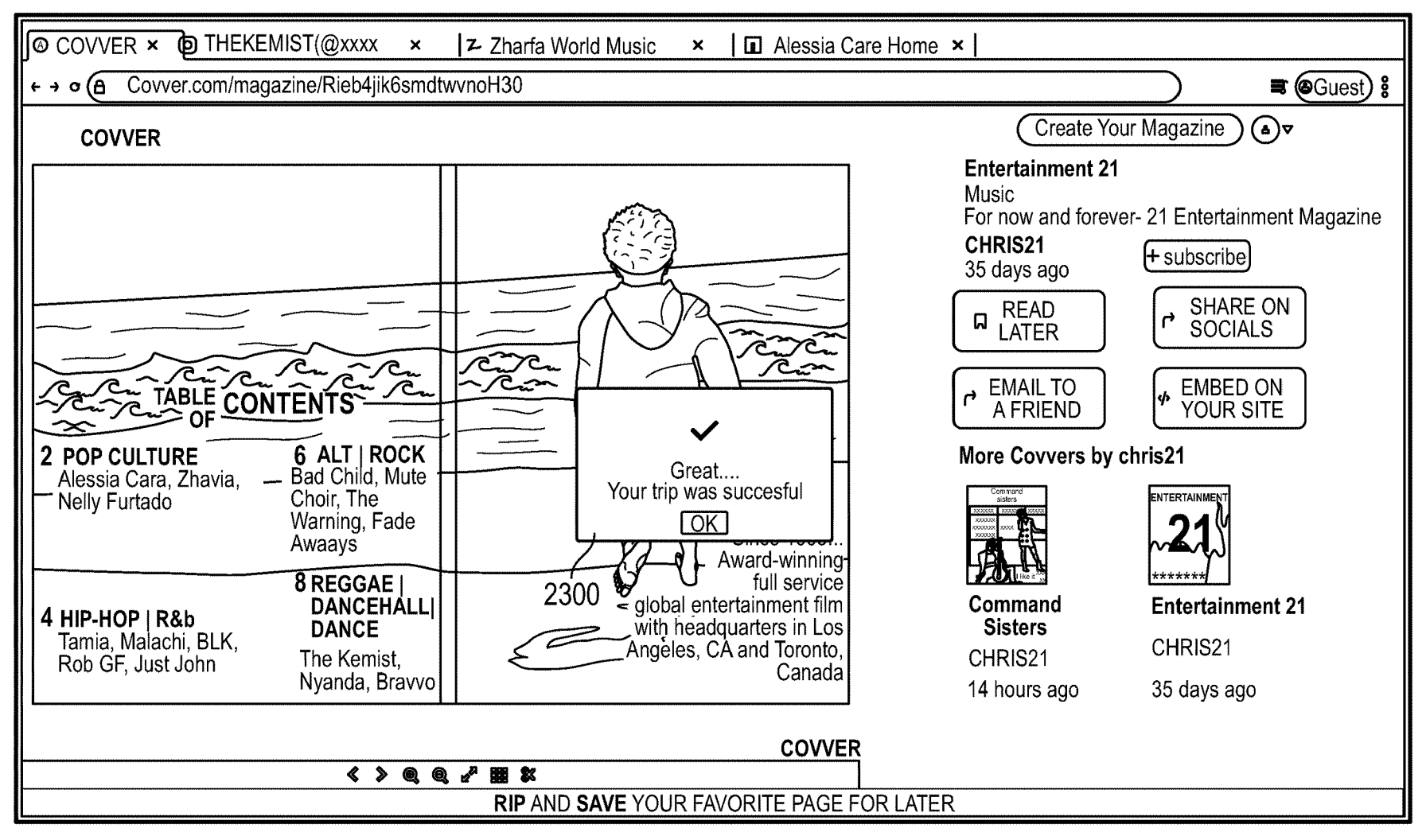

FIGS. 22-23 are screenshots of implementation of a rip control;

DETAILED DESCRIPTION

Figure 1:
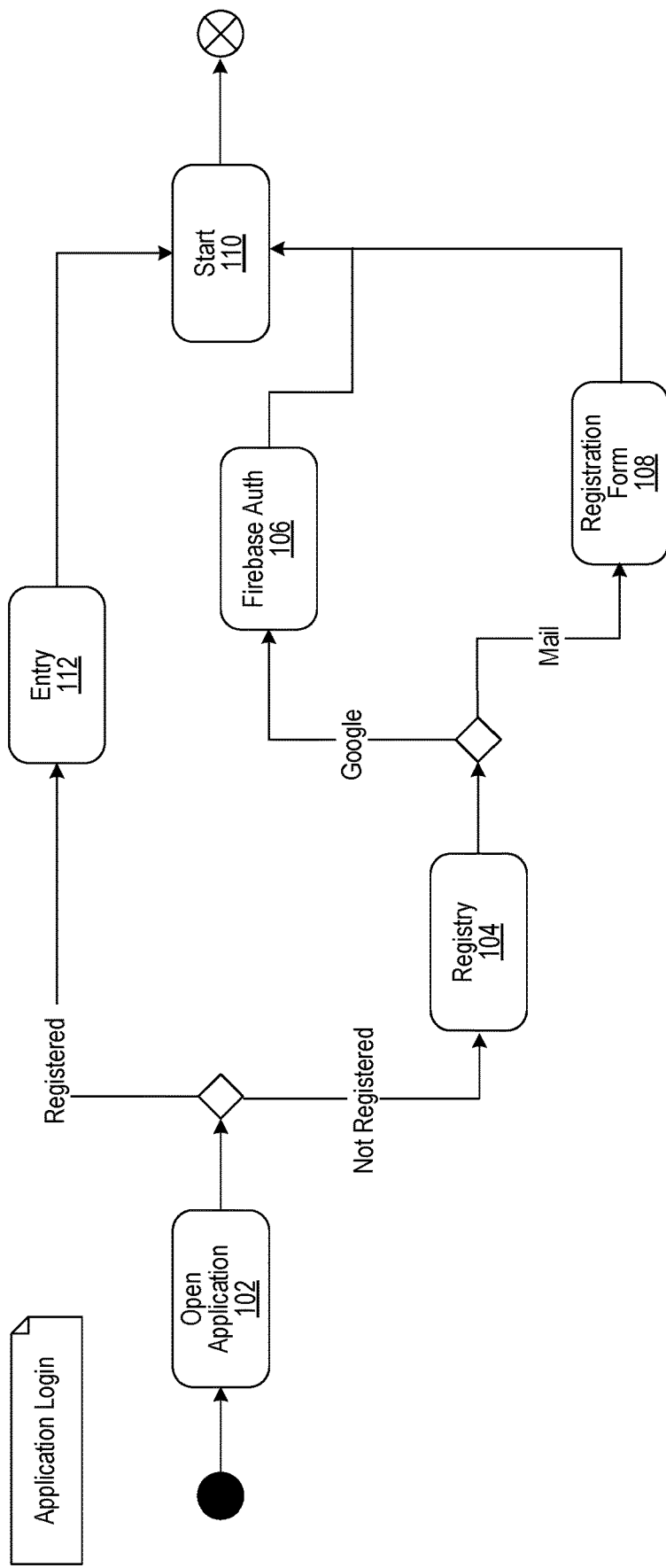
FIG. 1 is an activity diagram that shows the flow once the user initiates their platform session.

Various example embodiments will now be described. The following description provides certain specific details for a thorough understanding and enabling description of these examples. One skilled in the relevant technology will understand, however, that some of the disclosed embodiments may be practiced without many of these details.

Likewise, one skilled in the relevant technology will also understand that some of the embodiments may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this Detailed Description section.

In the background a publishing platform and a viewer platform are identified separately. No prior platform integrates these features (publishing and viewing). Further, additional features are enabled when the same platform integrates publishing and viewing features. Examples of integrated features include the rip feature that takes a page from a digital magazine from the viewer and enables that page for use in the publisher. Similarly, in some embodiments, a given user's viewing habits (e.g., likes, preferences, magazines viewed) influences templates most readily available in the publisher features.

Electronic Publishing/Viewing Platform

Reader—People that enter the platform to read and explore. They find other quality content by creators, family, and friends.

Creators—Creators that open an account want to create a magazine in the less amount of time and effort possible. With the publishing platform, it is quick and easy to publish a magazine.

Advanced Creators—Creators who want to create their own magazine design. They want more options for their design and to reach another type of community.

Advertisers—Brands and people who want to target the reader community, with quality brand exposure.

Known platforms are Business-to-Business, while the magazine publisher/viewer platform is direct to consumers and companies. Thus, the magazine publisher/viewer platform, due to its approach and technology, empowers everyone to become a magazine creator. The present platform is the only platform with a complete creation experience, including an easy builder (Easy as 1,2,3), an advanced builder (more tools and flexibility), and a mobile application. In the magazine publisher/viewer platform ads are not intrusive. Ads are an inserted page in the magazine. The magazine publisher/viewer platform has no pop-ups; it does not disrupt the reader experience.

The magazine publisher/viewer platform has a unique rip a page feature, where creators can insert rip pages in their magazines. The rip page is credited back to the original creator and cannot be modified. The magazine publisher/viewer platform has an offline reader. In the magazine publisher/viewer platform readers can subscribe to magazine creators and get notified. In the magazine publisher/viewer platform creators can create private accounts and approve magazine readers. This is not an option in other platforms.

The magazine publisher/viewer platform optimizes pages to index in search engines. Comparatively, companies with other platforms have to hire magazine indexing services to position their magazines.

Most of the online magazine builders charge a very high licensing fee. In the magazine publisher/viewer platform, ad revenue is shared with creators, such as YouTube.

FIG. 1 is an activity diagram that shows the flow once the user initiates their platform session. In step 102, a user opens the application. In step 104 where the user has not already registered, the user is guided through registration to create a user profile where published digital magazine documents are stored as associated therewith. Once the account is created, in step 106, in some embodiments, the account coordinates with a firebase authorization scheme. In step 108, the platform performs a form registration. In step 110, once registration is complete, the application starts. Where registration has been completed already, in step 112, the user enters the application with a registration and proceeds to step 110.

Figure 2:
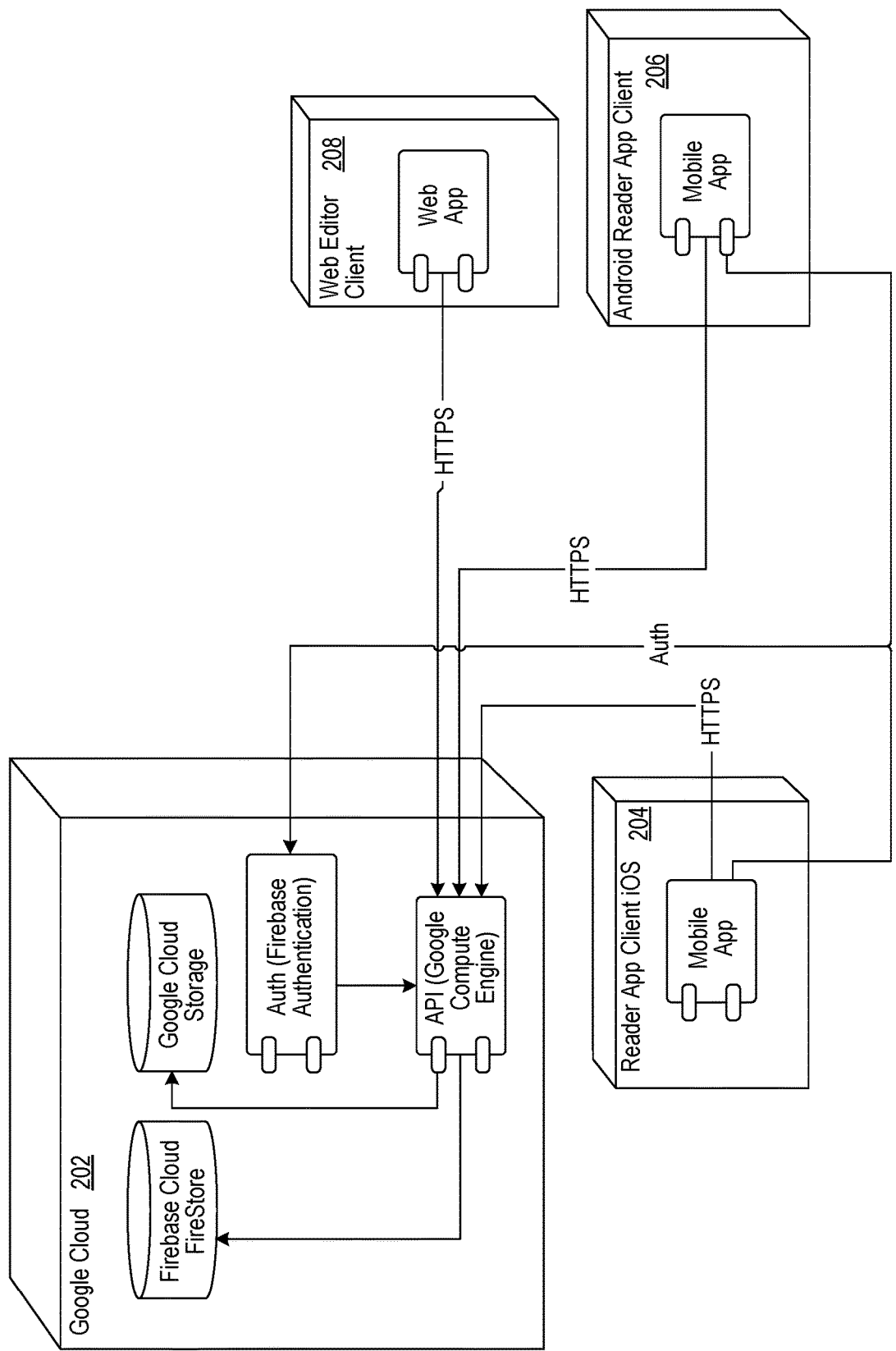
FIG. 2 is a deployment diagram showing the composition of the platform within servers and clients, the communication protocol, and how the entities interact.

FIG. 2 is a deployment diagram showing the composition of the platform within servers and clients, the communication protocol, and how the entities interact. In some embodiments, a cloud server 202 enables authentication procedures for users via native authentication support and further provides backend server services to administrate the application. A client application reader for relevant operating systems (e.g., iOS, Android, browser-based) 204, 206, 208 engages with the cloud authentication and execute the application locally on a user device.

Figure 3:
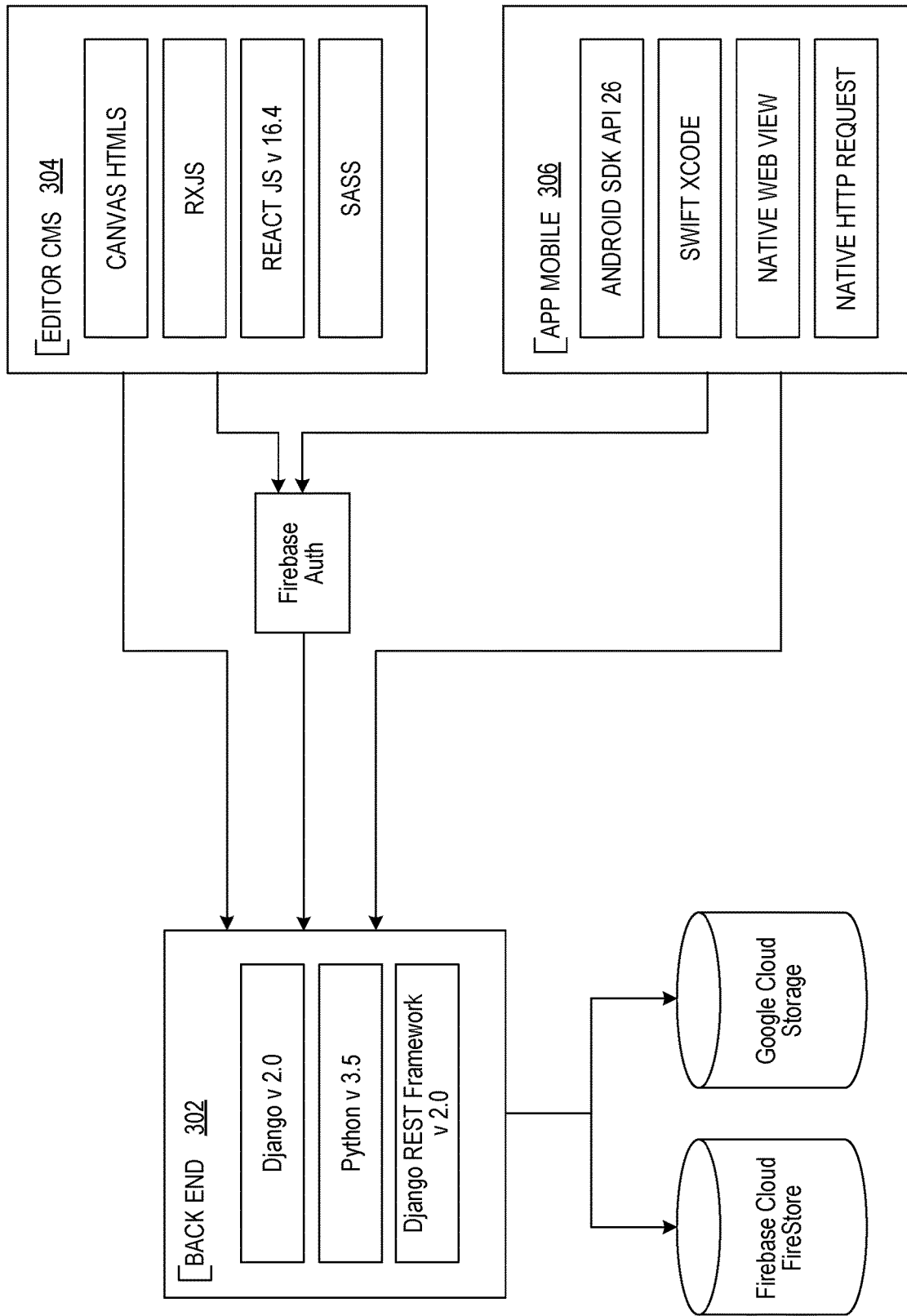
FIG. 3 is a block diagram showing technologies and versions to incorporate in embodiments of the invention.

FIG. 3 is a block diagram showing technologies and versions to incorporate in embodiments of the invention. A backend server 300 may be coded using a number of programming languages and frameworks. For example, the backend server may be programmed using Python, and Django framework. Other examples include Java/Javascript/NodeJS, Kotlin, Go, Swift. A web application 304 may be built using a number of programming languages and tools, such as canvas HTML5, RxJS, React JS, and SASS. A mobile application may be built via a number of programming languages and tools as well, such as Android SDK, Swift Xcode, Native web view, and Native HTTP request.

Figure 4:
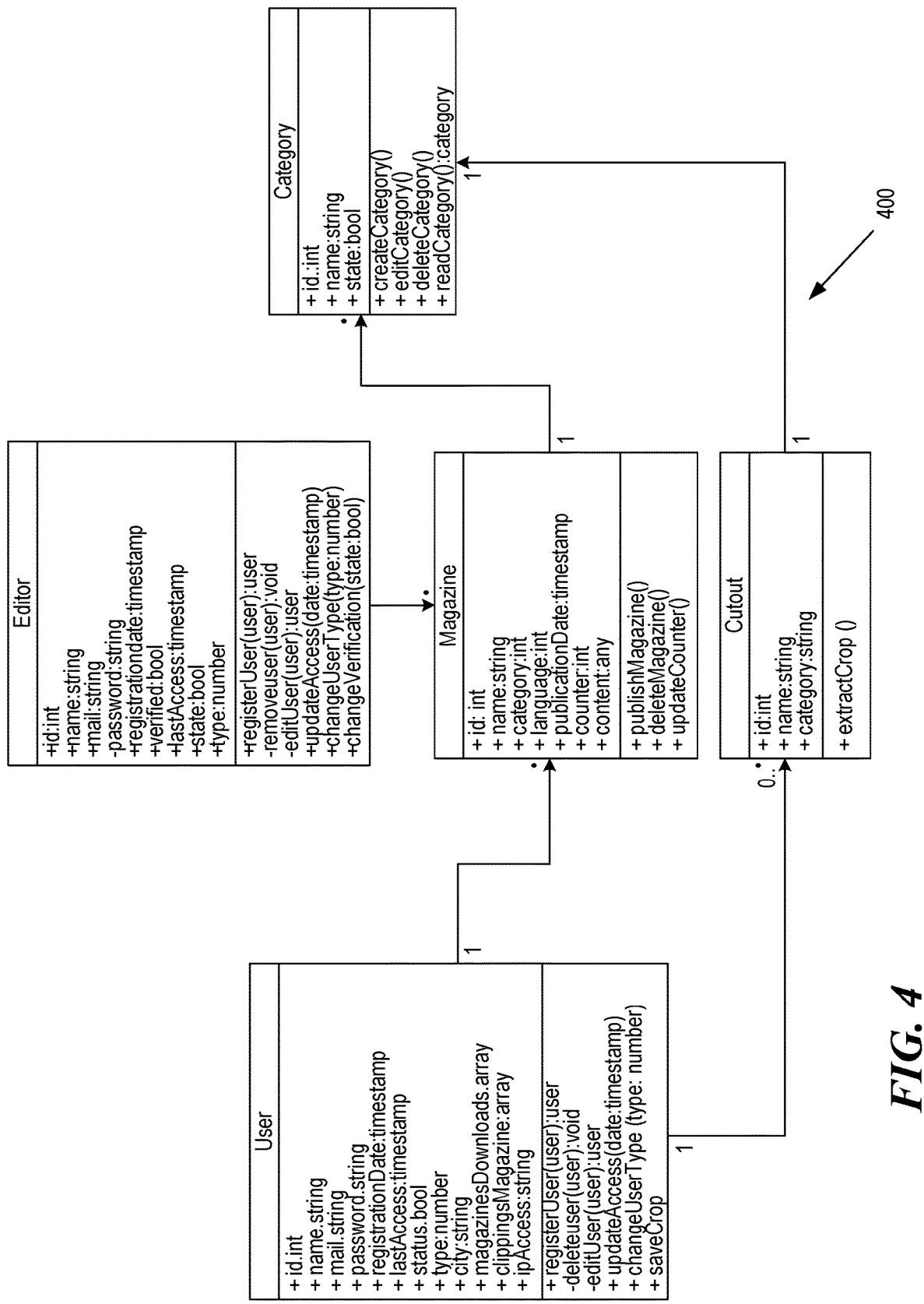
FIG. 4 is a block diagram showing platform programming classes.

FIG. 4 is a block diagram showing platform programming classes. In some embodiments, a program construct 400 includes a number of classes with objects and coded methods that, when executed, cause the various components of the disclosed digital magazine platforms to function for users. The classes interconnect and pass input and output therebetween.

Figure 5:
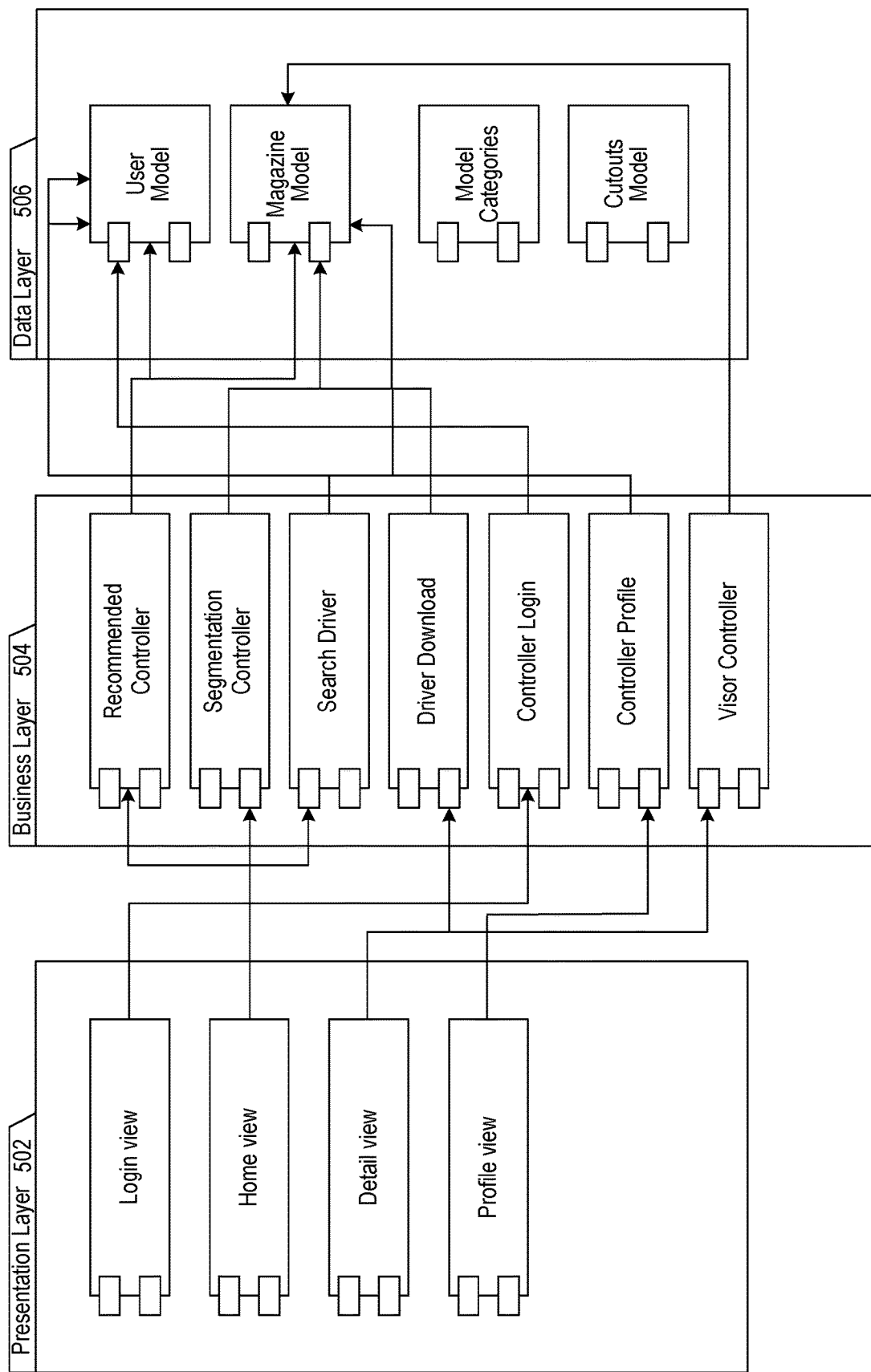
FIG. 5 is block diagram showing platform components.

FIG. 5 is block diagram showing platform components. Some embodiments of the disclosed platforms include a presentation layer 502, a negotiation layer 504, and a data layer 506. The presentation layer 502 includes user controls and interface components. The negotiation layer 504 controls the elements based on the input received from the user via the interface. The data layer 506 generates the content that is employed by other layers.

Figure 6:
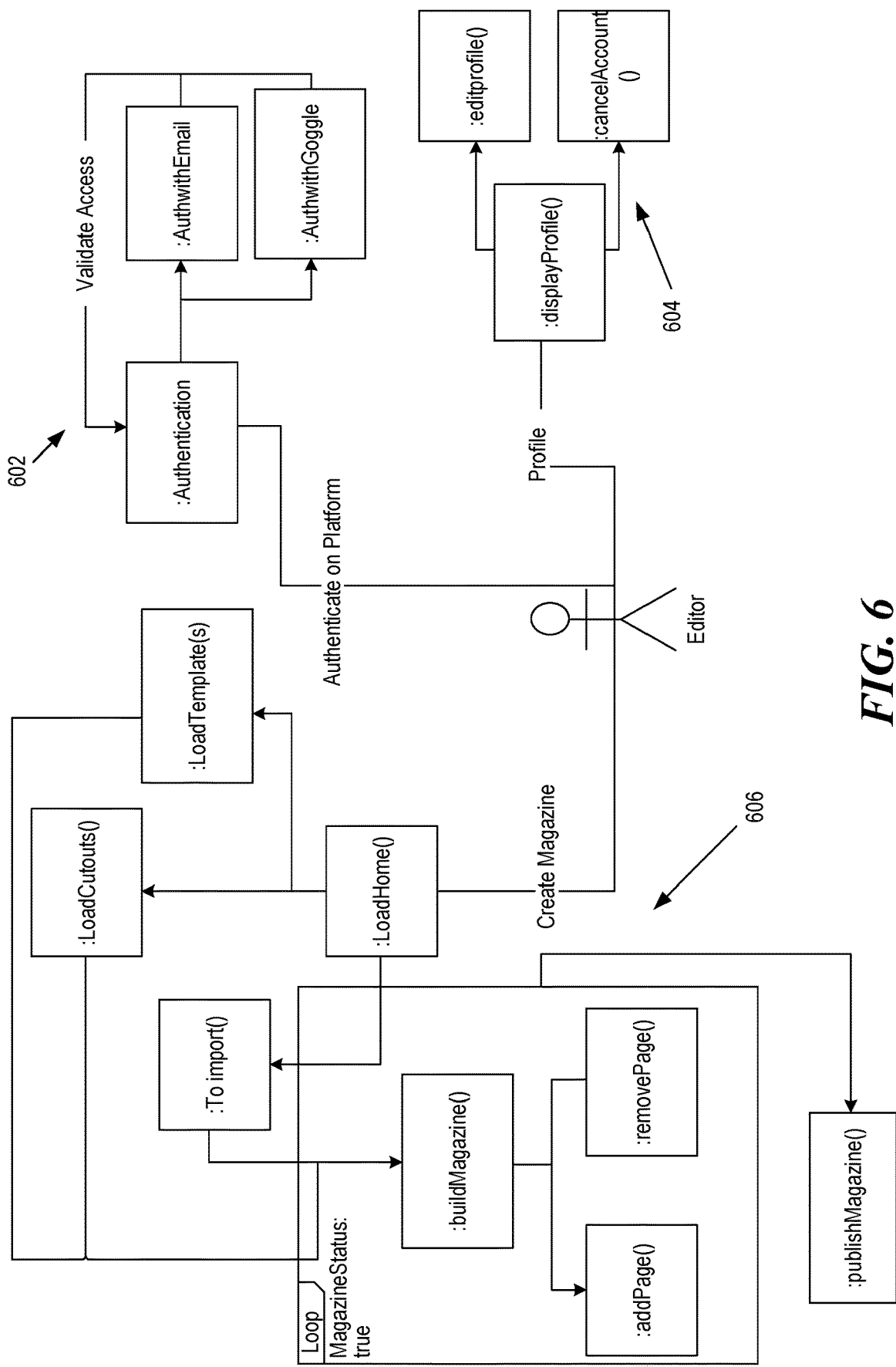
FIG. 6 is a block diagram showing platform communications.

FIG. 6 is a block diagram showing platform communications. A given user, via the interface is enabled to access the platform via a user authentication flow 602. Once the user has accessed the platform, they may modify their user profile via a user profile flow 604. Further, once the user has accessed the platform, they are enabled to create digital magazines via a create magazine flow 606.

Figure 7:
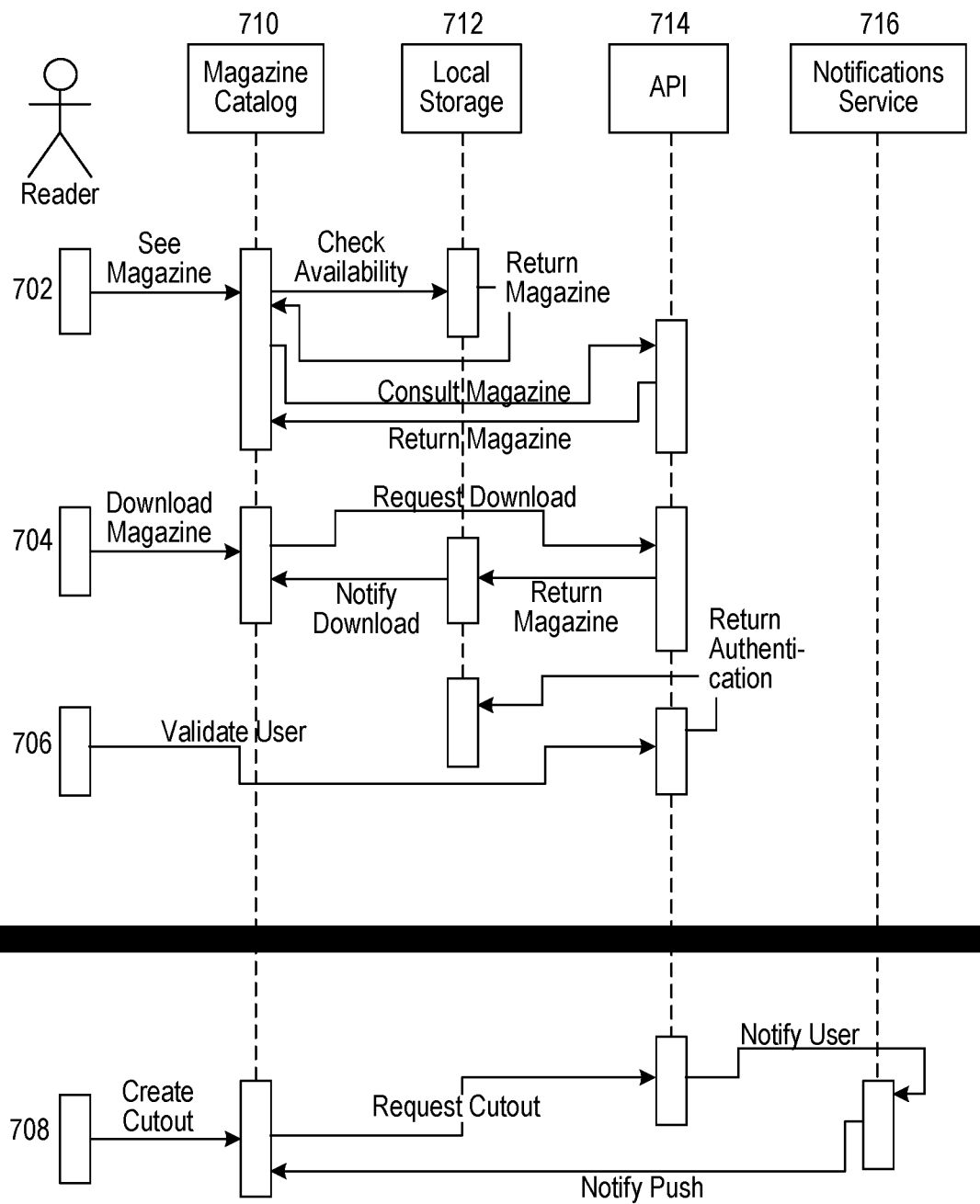
FIG. 7 is a block diagram showing platform sequences.

FIG. 7 is a block diagram showing platform sequences. The platform includes a number of sequences including "view magazine" 702, "download magazine" 704, validate user 706, and "create magazine" 708. These processes interact with a number of program constructs: a catalog of magazines 710, local data storage 712, an application program interface 714, and a notification service 716. The processes cross each of the program constructs.

Use Cases

Figure 8:
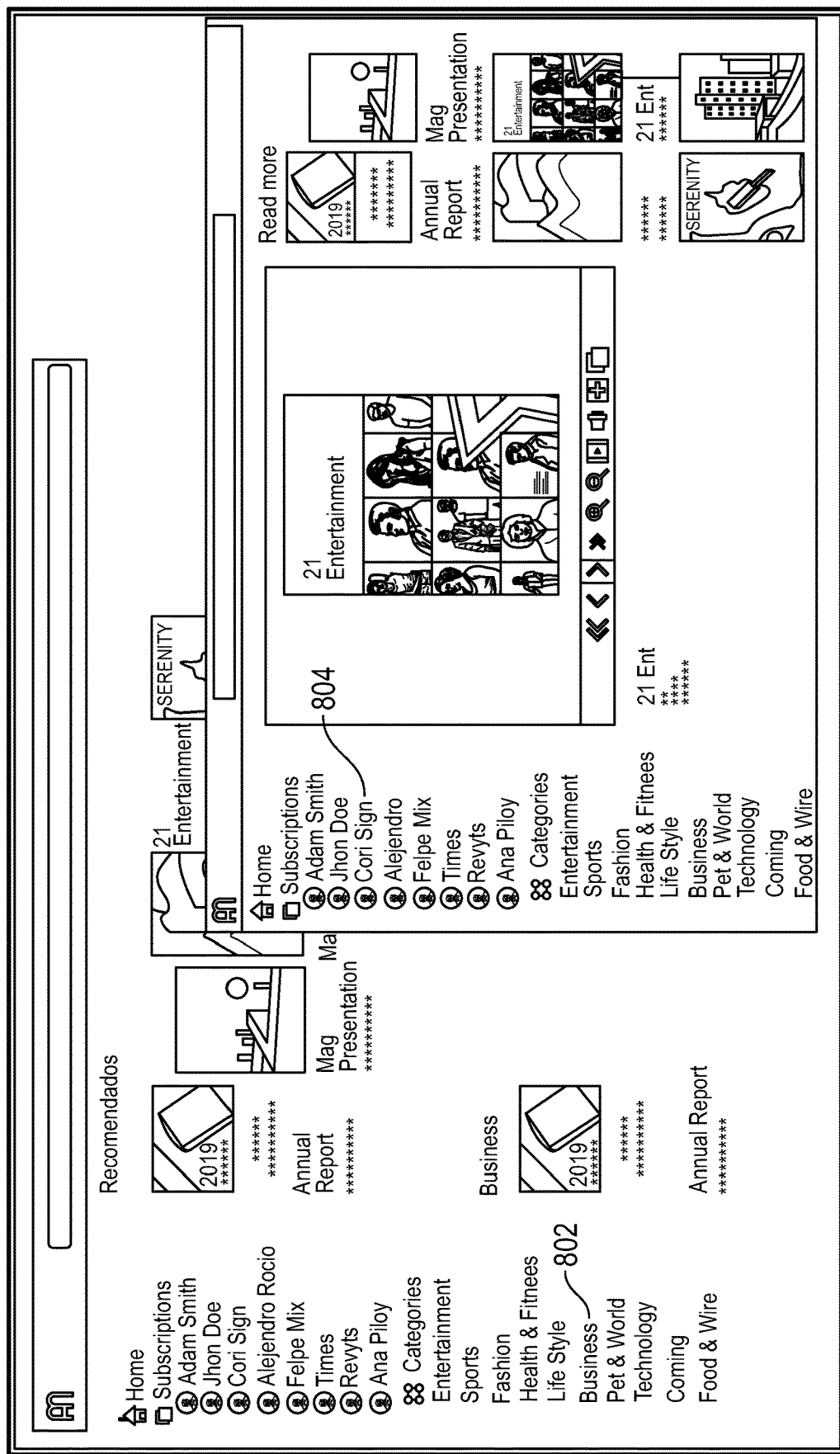
FIG. 8 shows a first design made for the main landing page.
Figure 9:
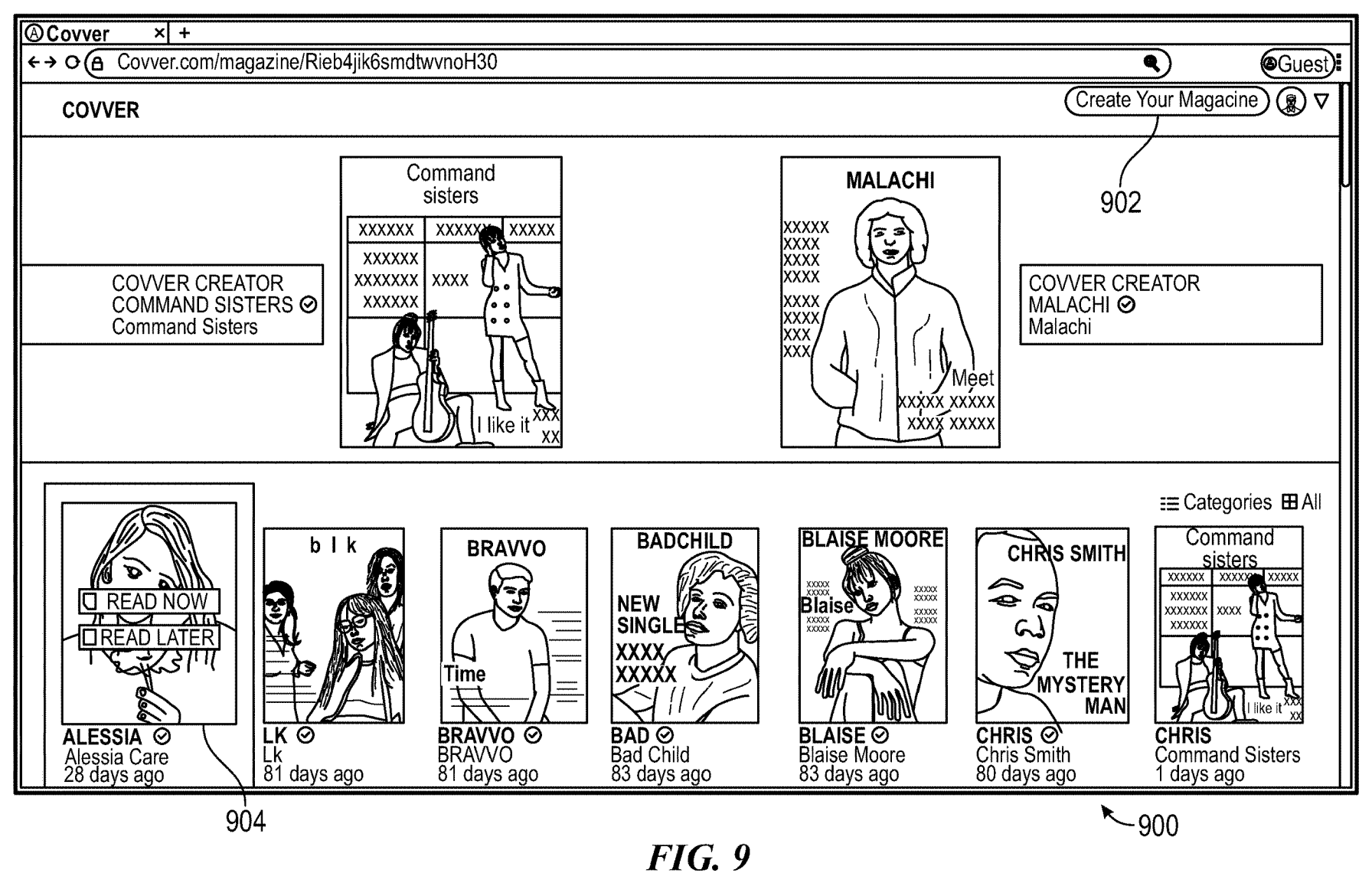
Figure 10:
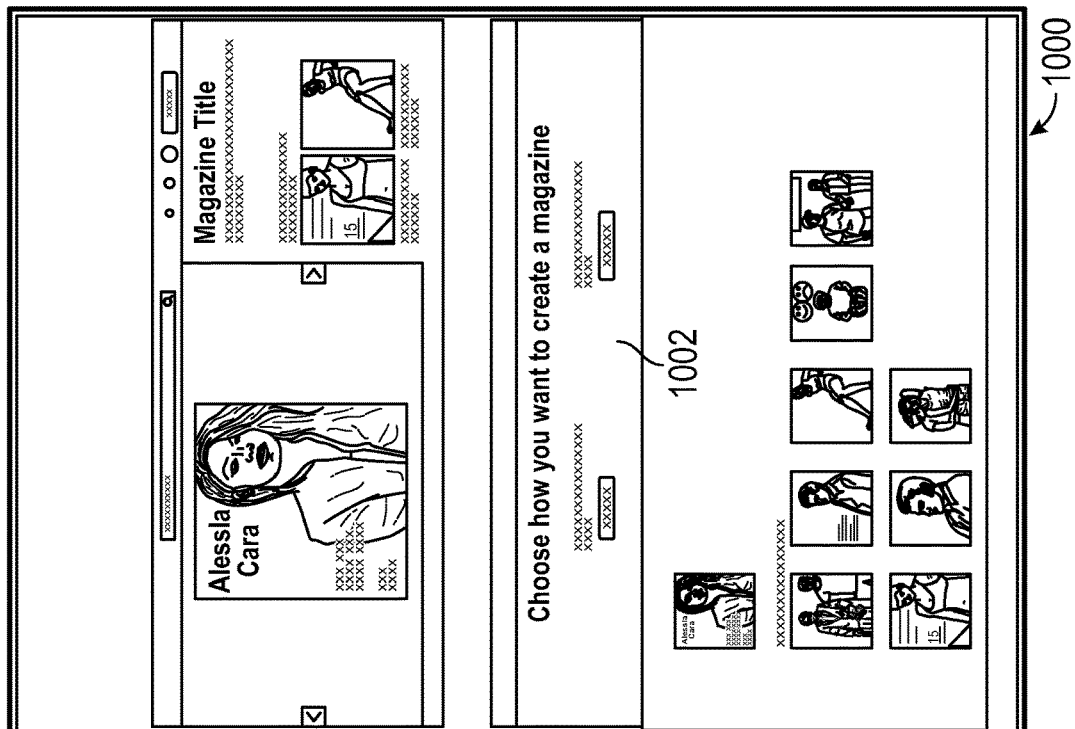
FIG. 10 shows a third version of user interface and user experience of the main landing page.
Figure 10:
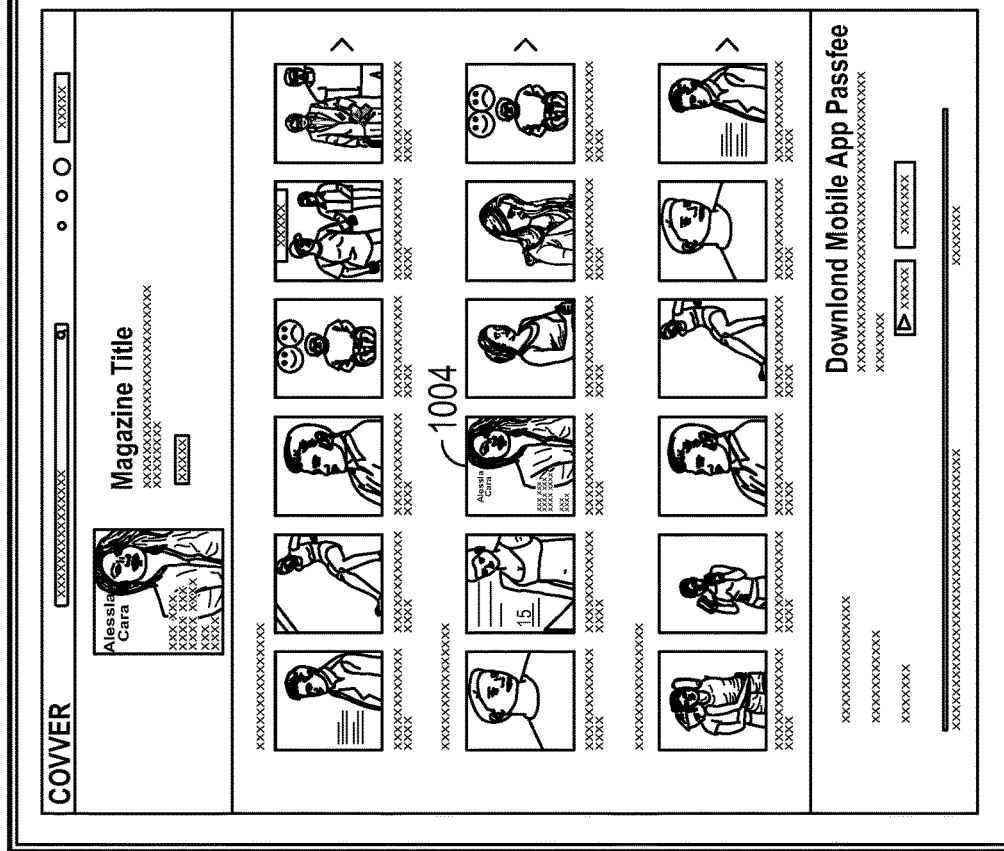
Figure 11:
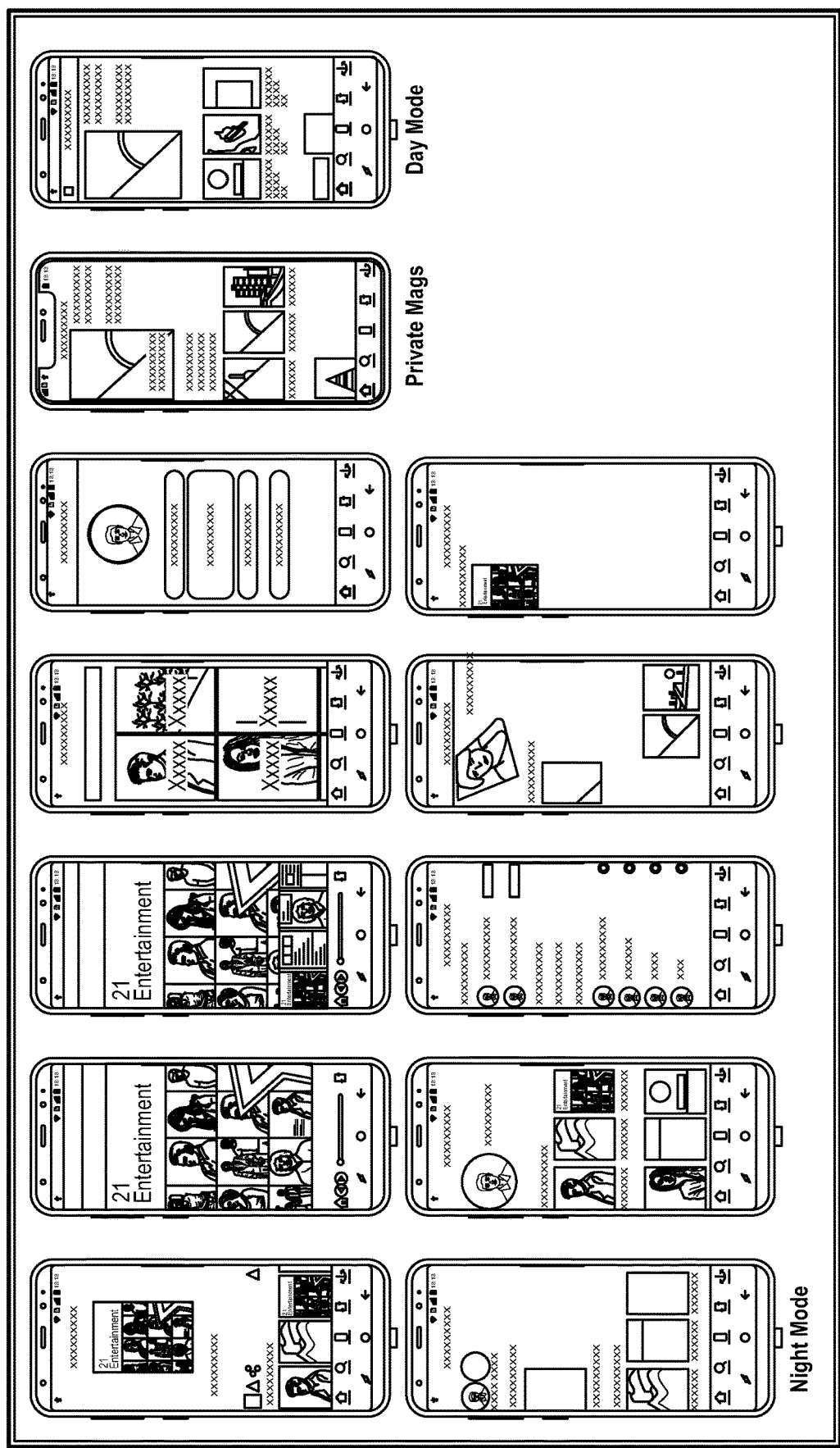
FIG. 11 shows all the user experience and design of each of the step the user takes in the mobile application.

FIG. 8-10 concern the user experience for combining multiple platforms—specifically, a publishing platform and a viewing platform, in some implementations, the combination is done with a reader search feature. FIG. 11 shows all the user experience and design of each of the step the user takes in the mobile application.

Figure 12:
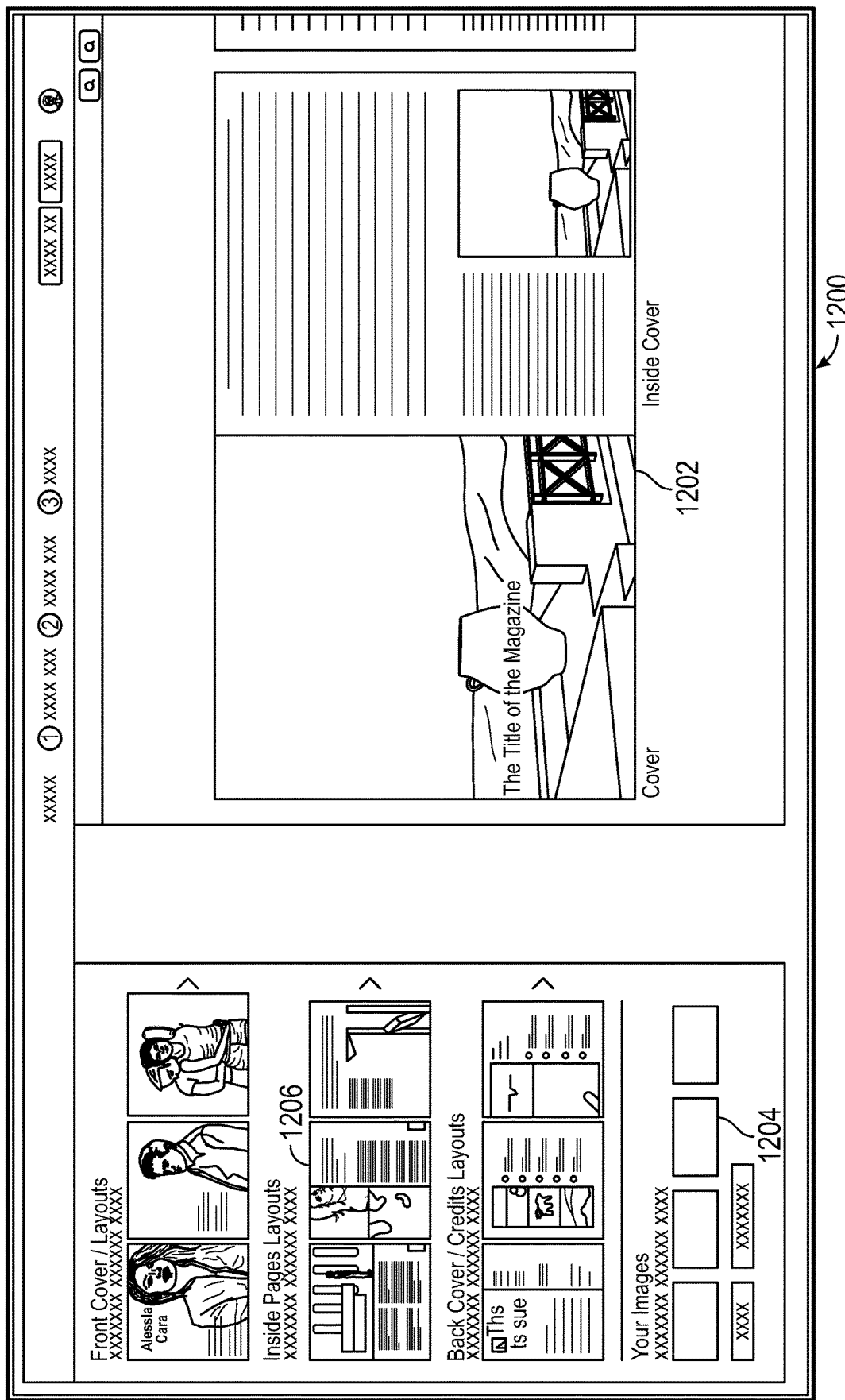
FIG. 12 shows a design implemented in the Easy Builder.
Figure 13:
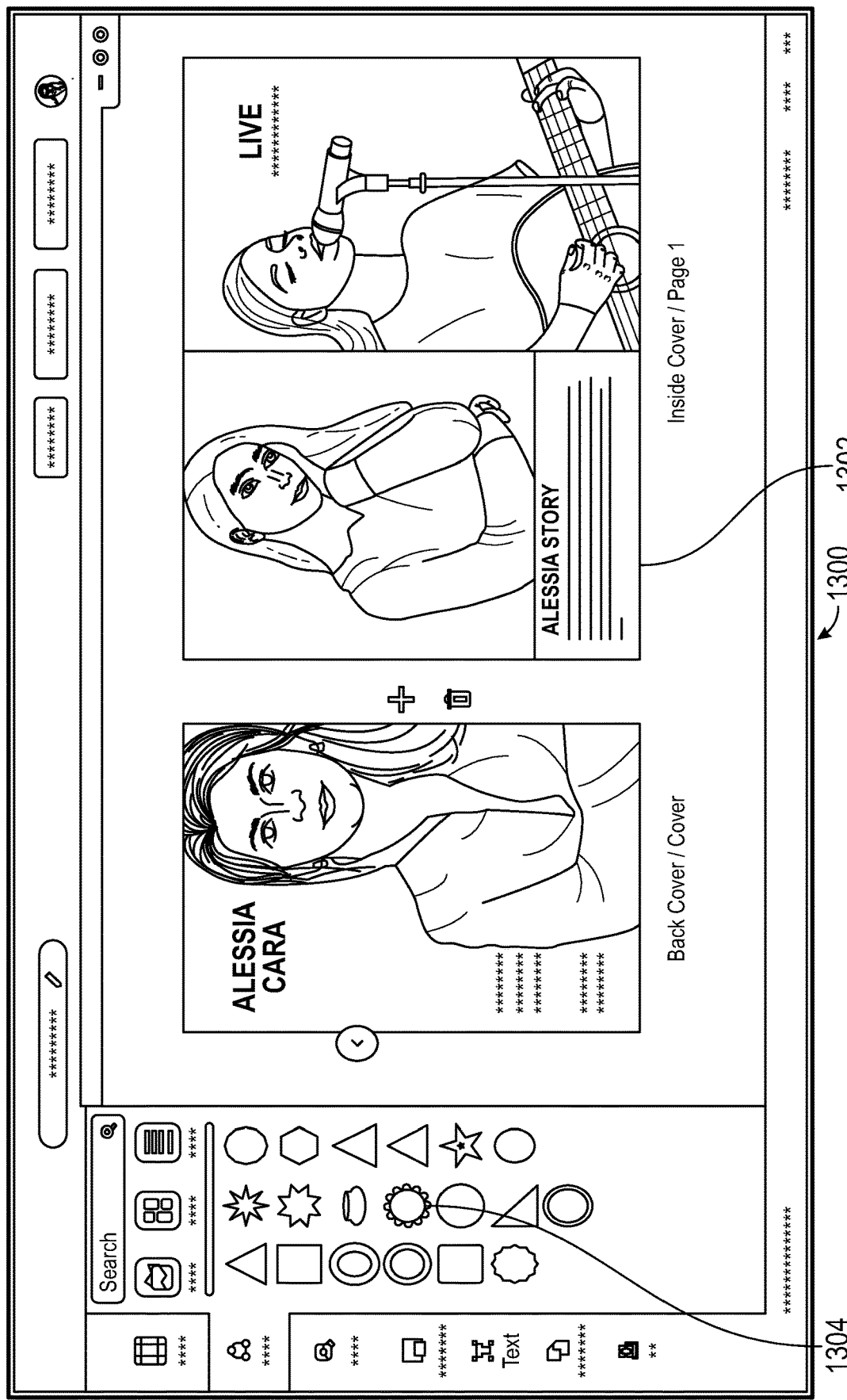
FIG. 13 shows a screenshot of the Advanced Builder, the second editor with a more resources and tools for customizing a magazine.
Figure 19:
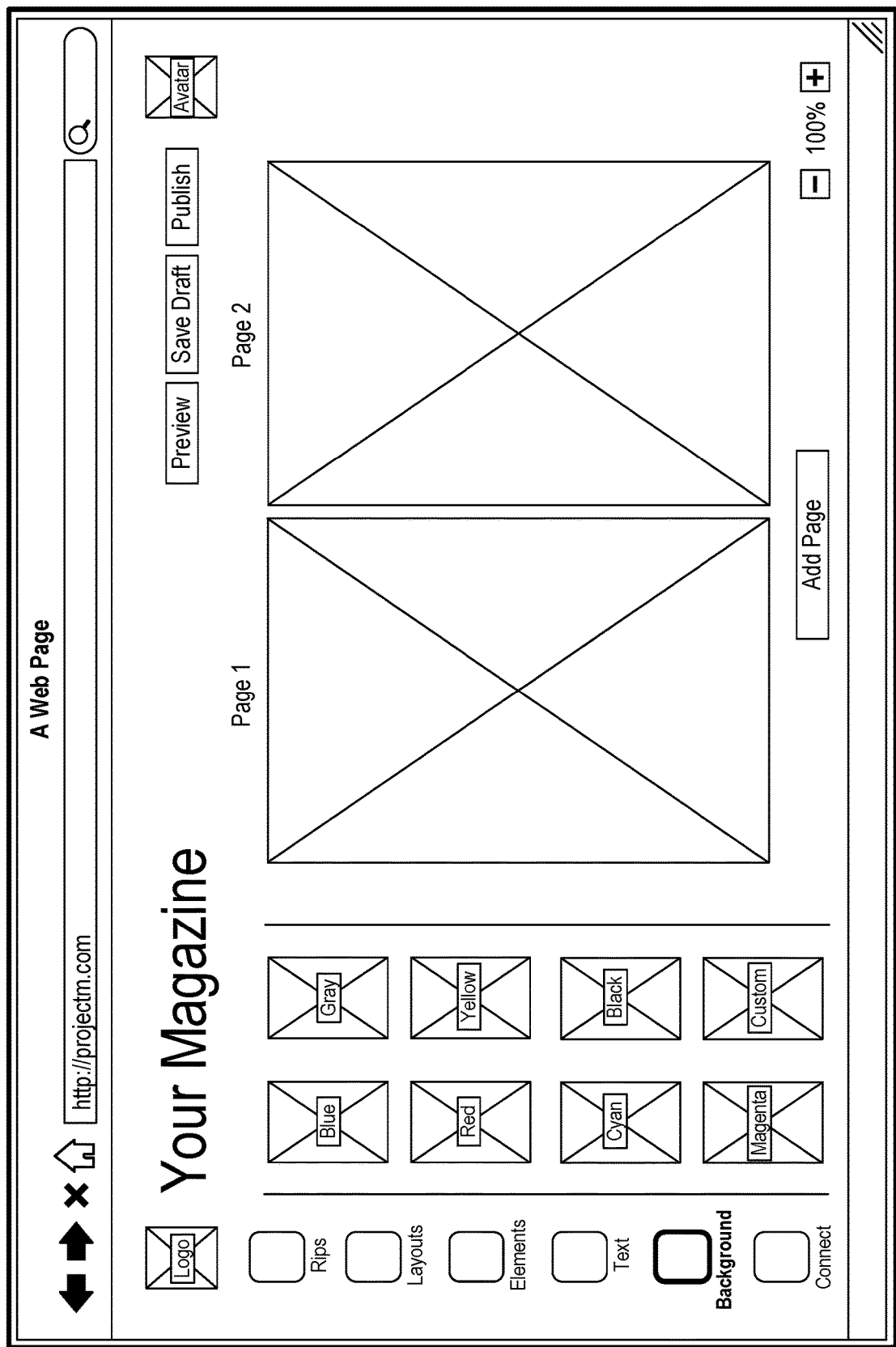
Figure 20:
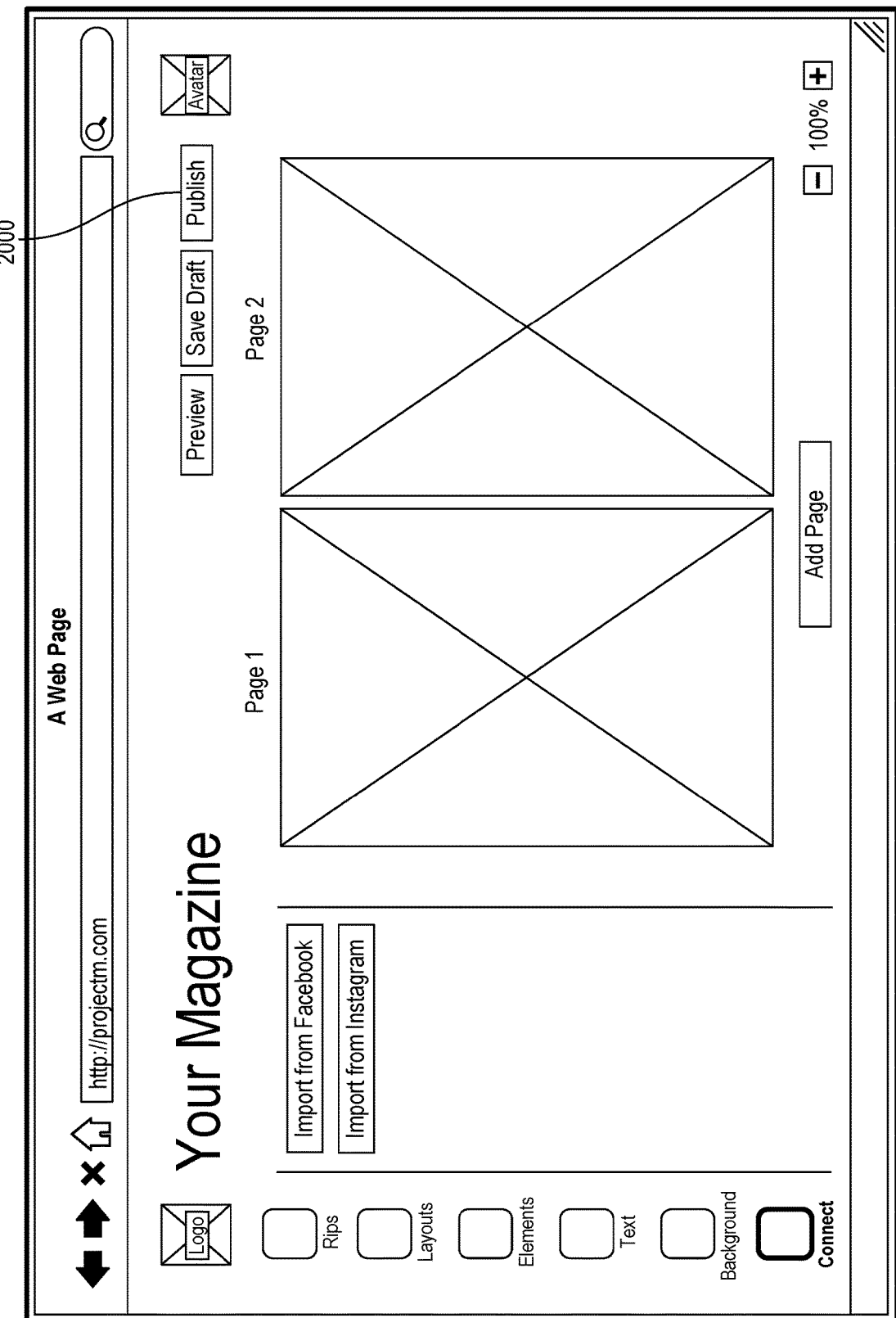
Figure 21:
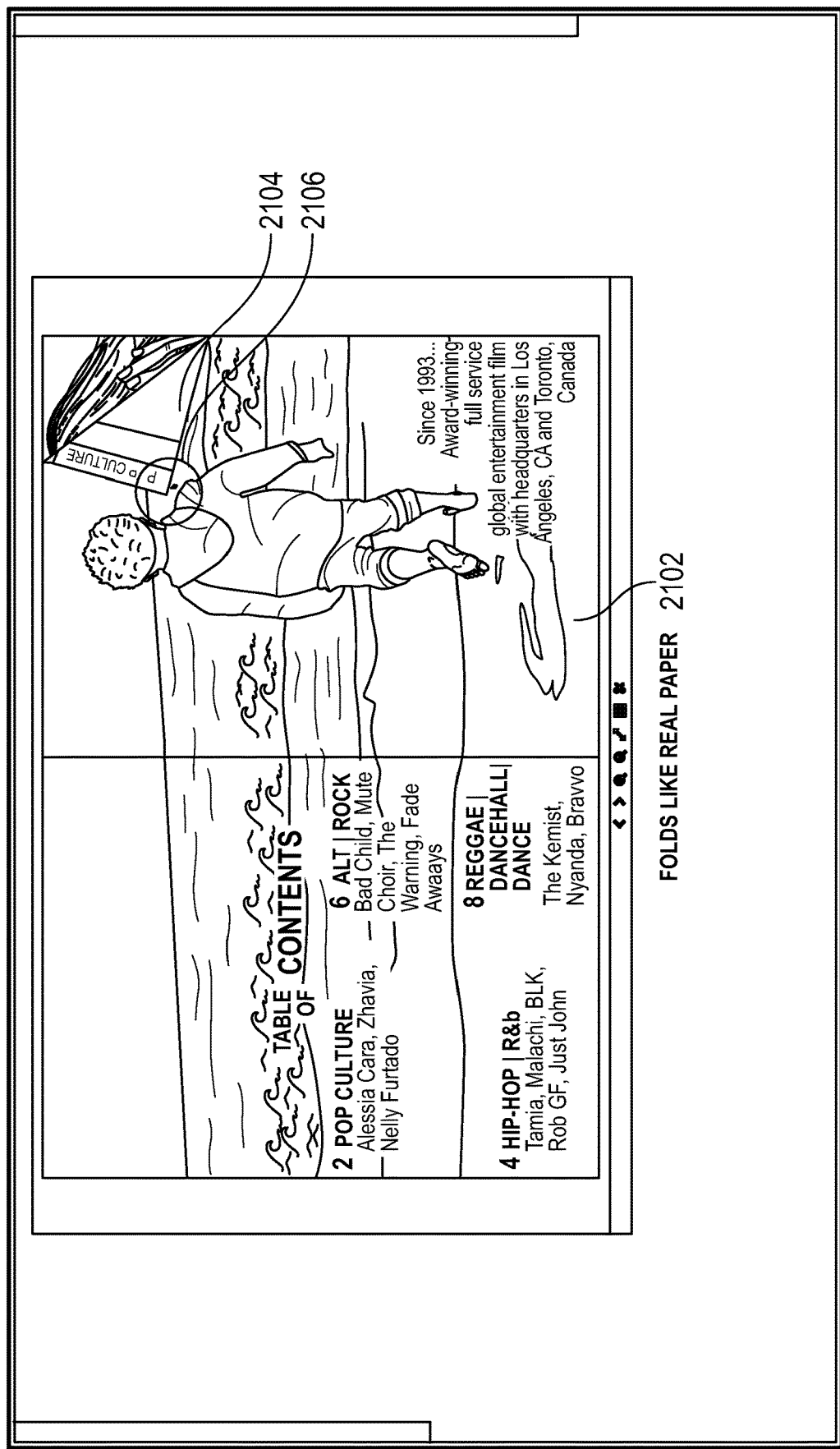
FIG. 21 is a screenshot of the viewing platform controls that enable flipping pages of the digital magazine documents via partial dragging.

FIGS. 12-23 concern the UX for publishers, in which FIG. 12 shows the design implemented in the Easy Builder (Easy as 1,2,3), FIG. 13 shows a screenshot of the Advanced Builder, the second editor with a more resources and tools for customizing a magazine, and FIGS. 14-20 are screenshots of the first block diagrams defining the UX for a content publisher in connection with platform. FIGS. 21 to 23 illustrate the implementation of the page turning and rip features.

FIG. 8 shows a first design made for the main landing page of a viewer platform 800. The main landing page connects users to digital magazine documents based on a set of categorical filters 802 and/or user-based subscriptions 804.

FIG. 9 shows a second user interface and user experience design for main landing page 900. The second user interface 900 connects users between two platforms: a digital magazine publishing platform 902 that enables users to design a digital layout of digital magazine documents including a plurality of templates and art controls, and a digital magazine viewer platform 906 that enables users to browse the digital magazine documents via flipping digital pages. The plurality of flippable pages include content. The landing page 900 includes a number of suggested digital magazine documents to select for viewing via the digital magazine viewer platform 906. The depicted landing page connects the two platforms together in a single unified experience on a single web browser instance using the same user login information.

FIG. 10 shows a third version of user interface and user experience of the main landing page 1000. The third landing page 1000 performs a similar function as the second landing page 900, and further includes a unified experience connecting the publishing platform 1002 and the viewing platform 1004.

FIG. 11 shows an expanded user experience and design of each of the step the user takes in the mobile application. FIG. 11 further displays implementation of privacy controls and user account customization.

FIG. 12 shows the design implemented in the Easy Builder 1200 (an implementation of the publishing platform). The easy builder 1200 includes a magazine preview pane 1202 that illustrates what the user's in-progress digital magazine layout will look like. The easy builder 1200 further includes custom user assets 1204 such as images, files, video, rips (as obtained from other published magazines), and other media that has been selected by the specific logged in user.

The easy builder 1200 further includes premade templates 1206 for magazine pages. The premade templates 1206 are organized into groups according to expected usage in the magazine (e.g. front/back covers, indexes, etc.). In some embodiments the templates 1206 are further organized by stylistic choices (e.g., classy, modern, family, teen, etc.). In some embodiments the stylistic choices and organized via a viewing history of the user on the viewing platform. Magazine styles that are viewed more often or that the user is subscribed to are given greater prominence in the user experience (e.g., given a different ordering and position in the publishing platform).

Magazine styles are identified from public, published digital magazine documents via metadata tags applied to the digital magazine documents or a trained machine learning model. The metadata tags are placed on the premade templates. When a user generates a magazine from templates, the metadata tags stay through to the published magazine document. During creation, where as user modifies a threshold number of elements from a given template, the metadata tags are removed as the current design may no longer resemble the originating template.

Where no such tags are available (e.g., because the template has been modified too greatly, or the design is custom), a machine learning model compares the page to training data pages to identify a style for the page and/or magazine as a whole. The model is trained based on other published magazine documents and validated using existing metadata tags. The training data makes an assumption that pages within the same magazine tend to be of similar styles and thus the training algorithm weights in favor tags that appear on any page of a given magazine.

The machine learning model does not specifically have to rely on metadata tags. In some embodiments of the model, the model identifies similarity between magazine styles and does not identify put any particular labels on the classifications. Some magazine styles are merely identified as more like than others.

FIG. 13 shows a screenshot of the Advanced Builder 1300, the second editor with a more resources and tools for customizing a magazine. Similar to the easy builder 1200, the advanced builder 1300 includes a magazine preview pane 1302 that illustrates what the user's in-progress digital magazine layout will look like. The primary distinction between the advanced builder 1300 and the easy builder 1200 is the custom asset pane 1304. The custom asset pane 1304 enables the user to builder their own graphics and styles. Over time, the elements used to develop custom styles are evaluated by the machine learning model and those elements used in certain combinations become associated with particular styles that the trained machine leaning model can identify.

Figure 14:
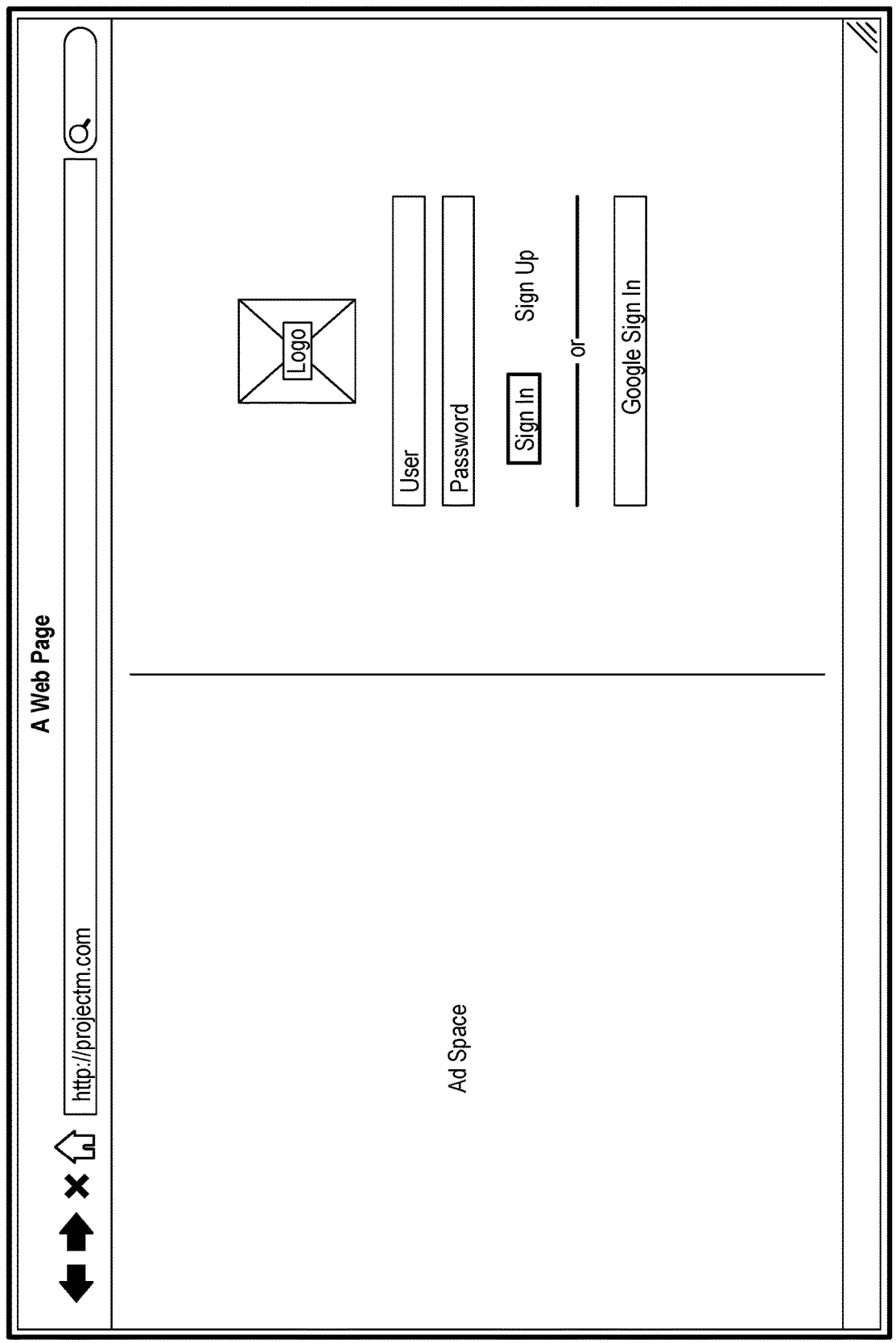
FIGS. 14-20 are screenshots showing of the first block diagrams defining the user experience in connection with platform.
Figure 15:
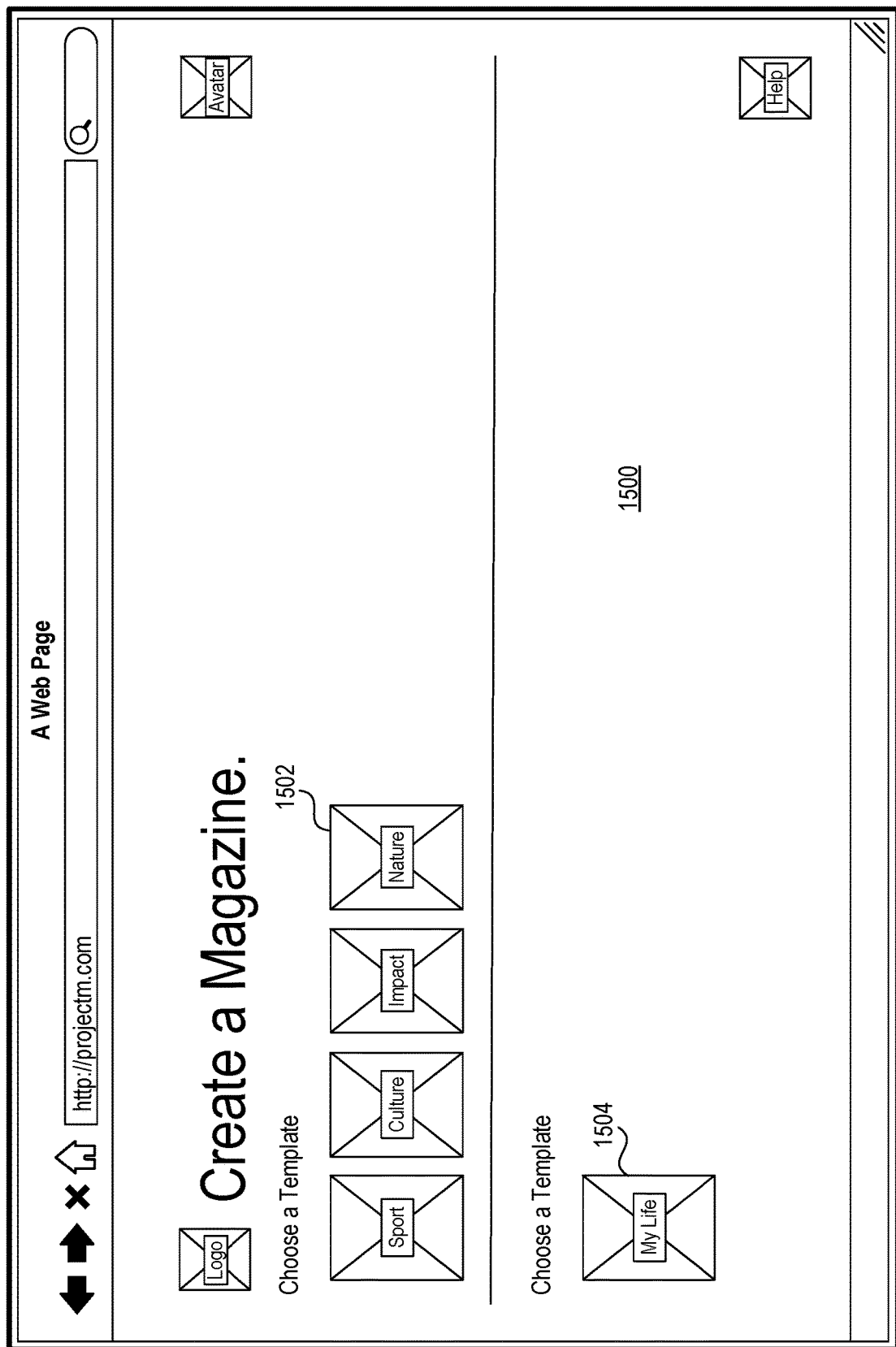

FIGS. 14-20 are screenshots showing of the first block diagrams defining the user experience in connection with platform. FIG. 14 illustrates a login page. FIG. 15 is a generic publishing platform interface 1500. The generic publishing platform interface 1500 includes a set of premade templates 1502 and a set of user-specific content 1504.

Figure 16:
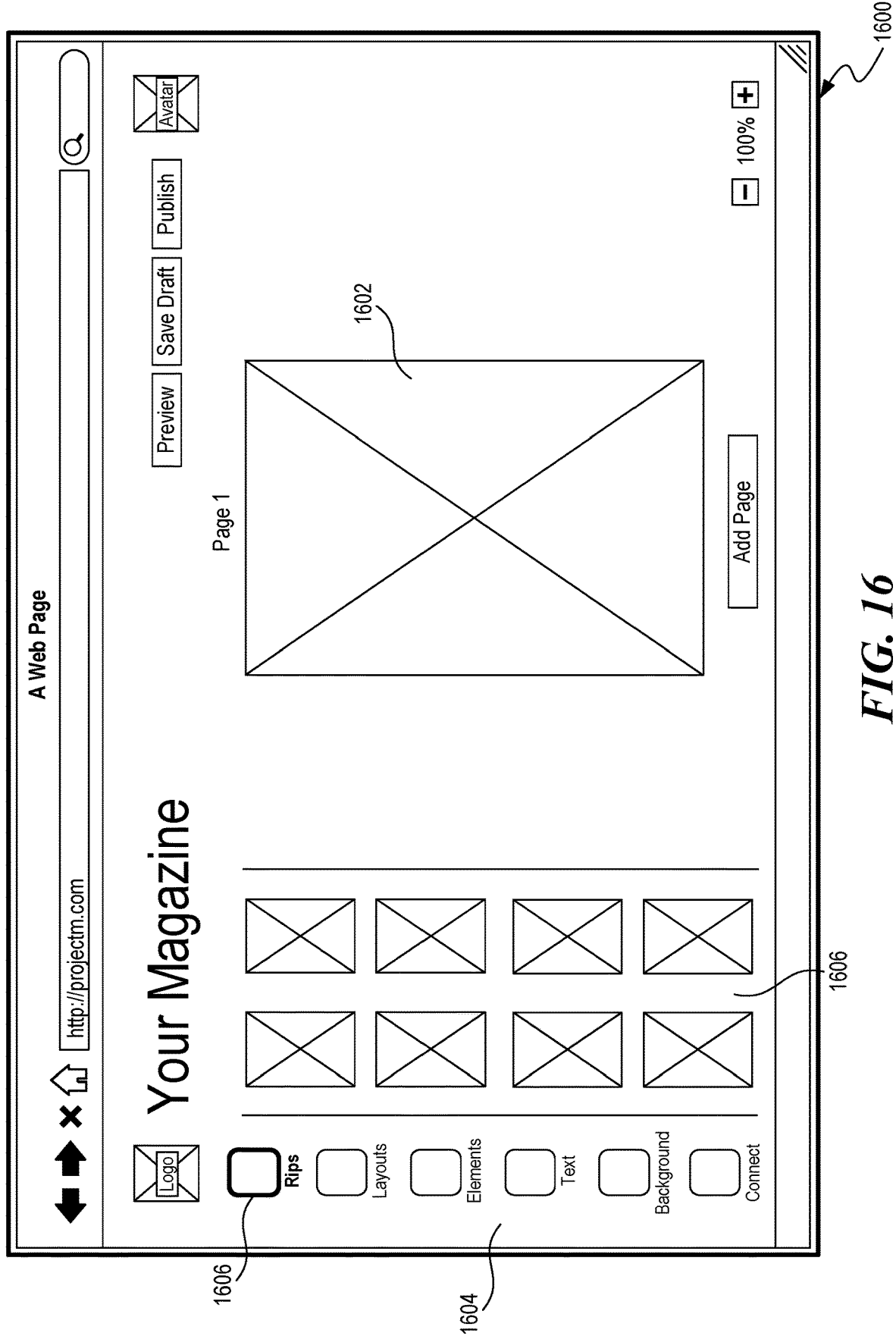

FIG. 16 illustrate a generic advanced publishing interface 1600. The generic advanced publishing interface 1600 include a preview pane 1602, a set of customization controls 1604, and the content elements relating to a currently selected customization control 1606. One of the customization controls 1604 is a rip feature 1608. The customization controls 1604 include a number of different features to customize a given magazine in the publisher. The rip feature 1606 enables a user to take pages or content elements from published digital magazine documents that user found while viewing the magazine content of others. While on the viewer platform, a user may "rip" a page from a magazine they are viewing. While in the publishing platform, the user of the publishing platform is enabled to insert the ripped page or ripped content into their draft digital magazine document.

In some embodiments, the ripped pages/content are broken into editable chunks in the manner that the page was originally created in another user's publishing platform. In other embodiments the ripped pages/content are not editable and present as exactly matching the magazine from which they were ripped either at the time of ripping or at present. Digital magazine documents may be modified at any time by the original user that created them. In this way, ripped content that has been edited or deleted (e.g., because the page or whole magazine has been removed) triggers an alert to the user who ripped the content in order to indicate that their digital magazine includes broken links.

Figure 17:
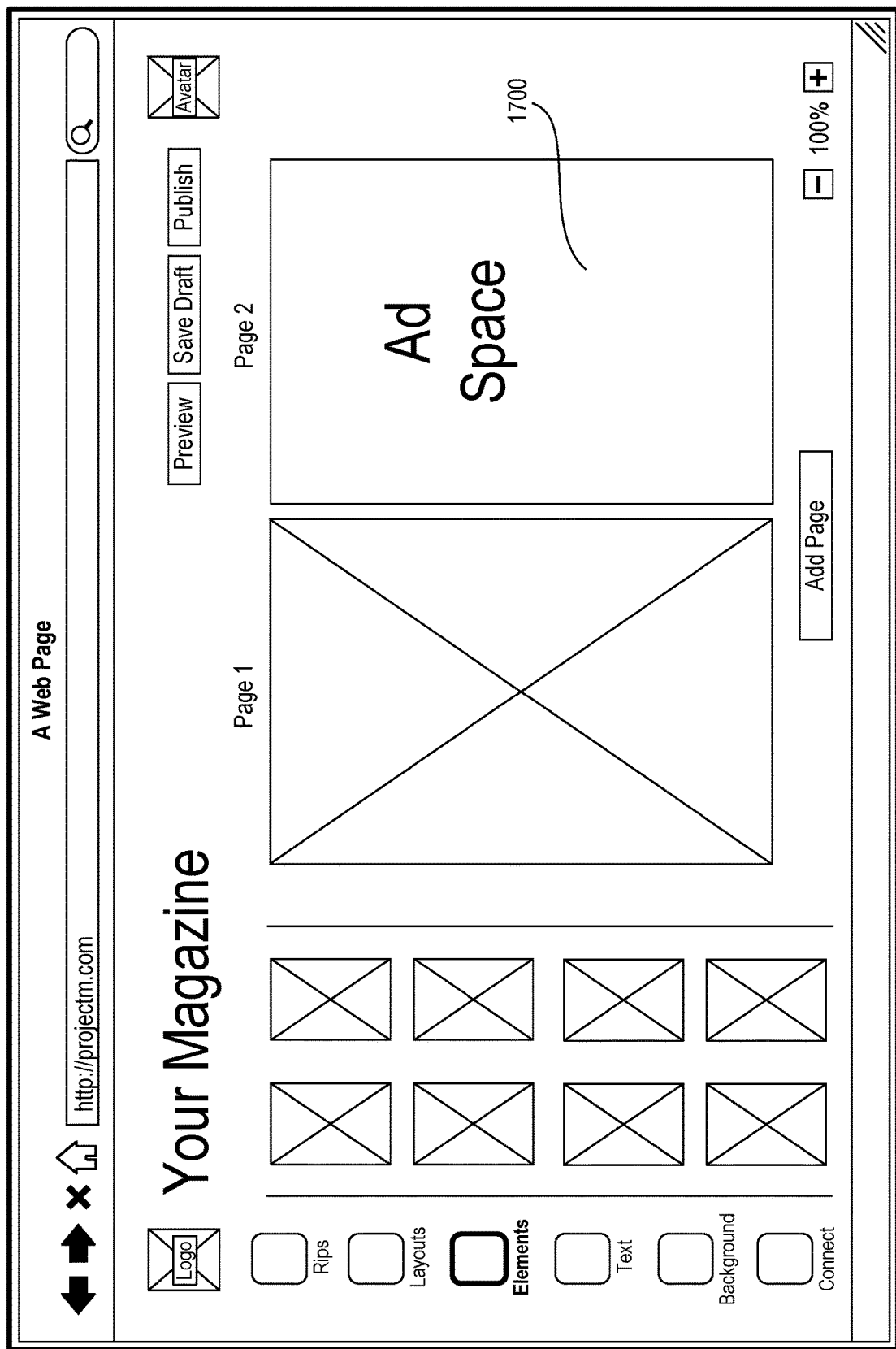

FIG. 17 illustrates an ad space element 1700 that users (or the platform) are enabled to insert into their digital magazine document. The ad space element 1700 enables monetization to be deployed by the user or platform. Physical magazines have long since employed the use of ad pages, but digital magazines have not. A viewer/reader platform in a digital magazine has not previously employed web page ad space that may be subject to Internet advertisement auctions. Page space in digital magazine have not previously made use of dynamic ad space. The online system holds content auctions on a revolving continuous basis for each of the available slots. Each slot goes to content based on bid value and overall quality score of the content using allocation schemes.

Pages are configured using a number of different promoted content loads and each are evaluated for utility. The allocation of page content prioritizes highest utility, measured in converted units that consider user experience, relation of promoted content to original user dictated parameters, and value offered by promoters. The auctions are on an ad-hoc, individual user basis. The ad space favors content that is germane to the current digital magazine and is further influenced by Internet cookies of the viewing user. When a publishing user inserts ad space into their digital magazine layout, that user is unaware of what specific ads will appear in that space for the various users who view their digital magazine. That content is filled in at run-time when the specific page is loaded for a viewing user.

As noted above, the ad space favors auction content that is similar to the stylistic choices of the current digital magazine. For example, a family centric digital magazine would devalue violent content and instead family related content (e.g., coupons to a pizza restaurant).

Figure 18:
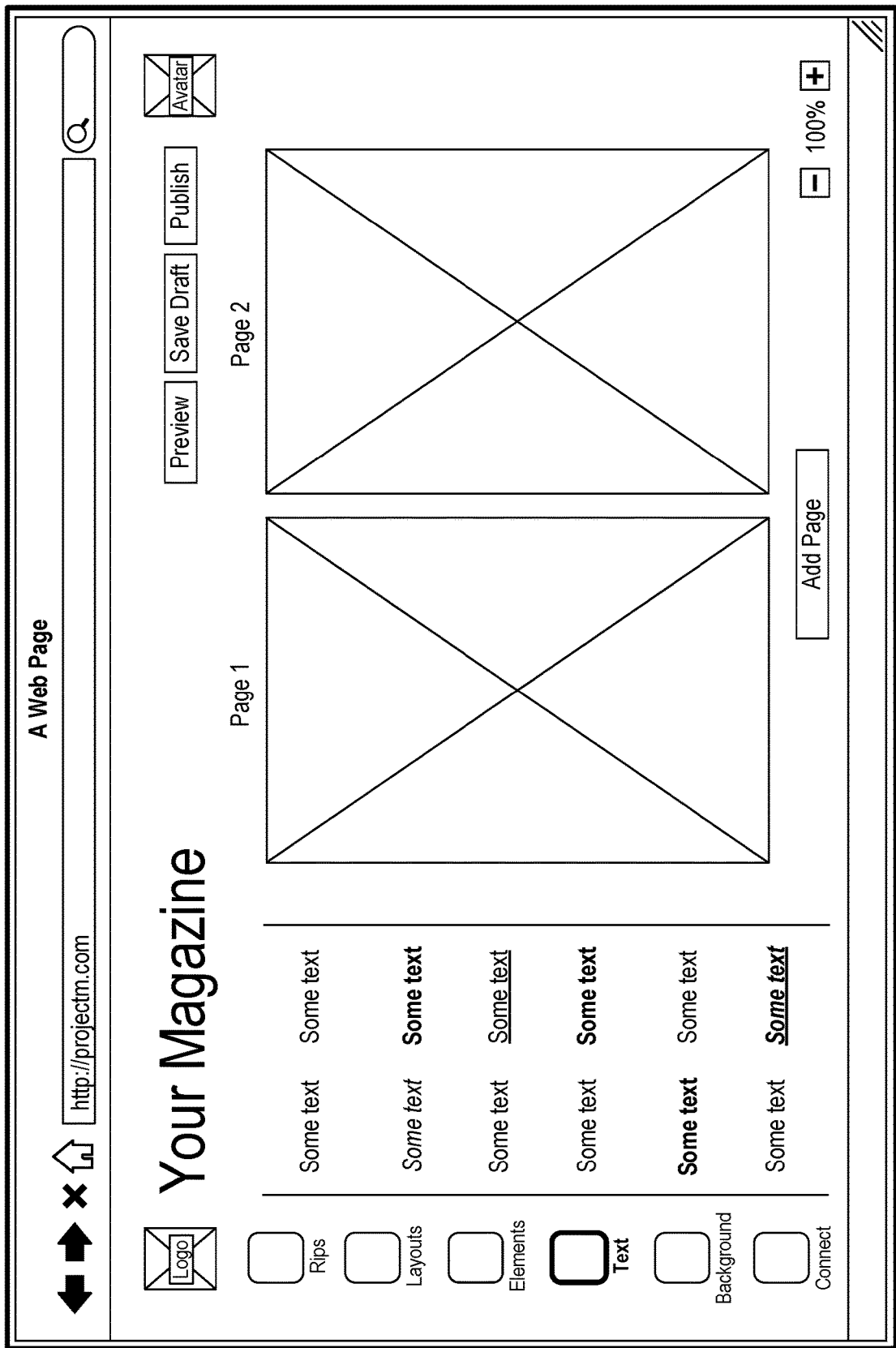

FIG. 18 illustrates an interface for adding text elements in multiple fonts to the digital magazine. FIG. 19 illustrates the addition of background colorings to a digital magazine document. FIG. 20 illustrates importing media elements from external web platforms such as social media sources. Once a user is satisfied with the digital magazine, they have built in the publishing platform, they may publish 2000 that digital magazine. Activating the publish control 2000 makes the digital magazine automatically searchable and viewable on the viewer platform right away. In this way the publish is enabled to both design and create a digital magazine, and then immediately obtain some degree of circulation based on being searchable and indexed via stylistic meta tags and/or machine learning model style guides.

FIG. 21 is a screenshot of the viewing platform controls 2100 that enable flipping pages of the digital magazine documents via partial dragging. The screenshot includes a first page 2102 and a second, opposite page 2104. The digital pages are two-sided, each opposite the other (as are real pages). To flip from one page to the next a user employs their cursor 2106 to drag the pages. The degree or extent of the page flipping is based on how fast and far the user has moved their cursor 2106. The cursor 2106 may either advance or flip back the page based on the direction of movement by the user. As the page begins to flip, the web element of the page displays the content of the next page advancing at the rate the user moves their cursor 2106.

FIGS. 22-23 are screenshots of implementation of a rip control 2200. In FIG. 22, the rip control 2200 is implemented in the "binding" of the digital magazine. Where the viewing user hover's their cursor over the binding, a scissors icon appears that enable ripping all or part of the current page. In FIG. 23, once completed, the viewing platform indicates 2300 that the rip was successful, and that content will appear in that user's publisher platform interface.

Cryptographic Platforms

Public and private keys are an integral component of cryptocurrencies built on blockchain networks and are part of a larger field of cryptography known as public-key cryptography (PKC) or asymmetric encryption. The goal of PKC is to easily transition from a first state (e.g., a private key) to a second state (e.g., a public key) while reversing the transition from the second state to the first state nearly impossible, and in the process, proving possession of a secret key without exposing that secret key. The product is subsequently a one-way mathematical function, which makes it ideal for validating the authenticity of transactions such as cryptocurrency transactions because possession of the first state such as the secret key cannot be forged. PKC relies on a two-key model, the public and private key.

The general purpose of PKC is to enable secure, private communication using digital signatures in a public channel that is susceptible to potentially malicious eavesdroppers. In the context of cryptographic tokens, the goal is to prove that a traded token was indeed signed by the owner of that token, and was not forged, all occurring over a public blockchain network between peers. A private key of a blockchain wallet unlocks the right for the blockchain wallet's owner to spend transfer tokens in the blockchain wallet and therefore must remain private. A wallet address of the blockchain wallet is cryptographically linked to the blockchain wallet's private key and is publicly available to all users to enable other users to send NFTs to the user's blockchain wallet. For example, the wallet address may be a public key generated from the blockchain wallet's private key using one or more PKC algorithms. Public keys are generally used to identify wallets, whereas the private keys are used to authorize actions of the respective wallet.

Wallet addresses for blockchain wallets are typically represented in human-legible form in one of three ways: as a hexadecimal representation, as a Base64 representation, or as a Base58 representation. In each of these common ways of representing the wallet addresses, each wallet address is represented using a string of letters and numbers, typically exceeding 20 characters in length. The length and randomness of the alphanumeric string makes the wallet address unwieldy and difficult to remember, thereby decreasing its usability and hindering the adoption of cryptocurrencies.

Miners operating on the network for the base cryptocurrency power execution of a distributed application (dApp) or smart contract. The smart contract is held by an administrative user and includes the cryptographic tokens. The custom cryptographic tokens do not "move" in the same sense that the base cryptocurrency moves via transactions. The smart contract is "held" by the administrative user though secondary users may interact with the smart contract and various portions (specific tokens) may be attributed to those secondary users.

Figure 24:
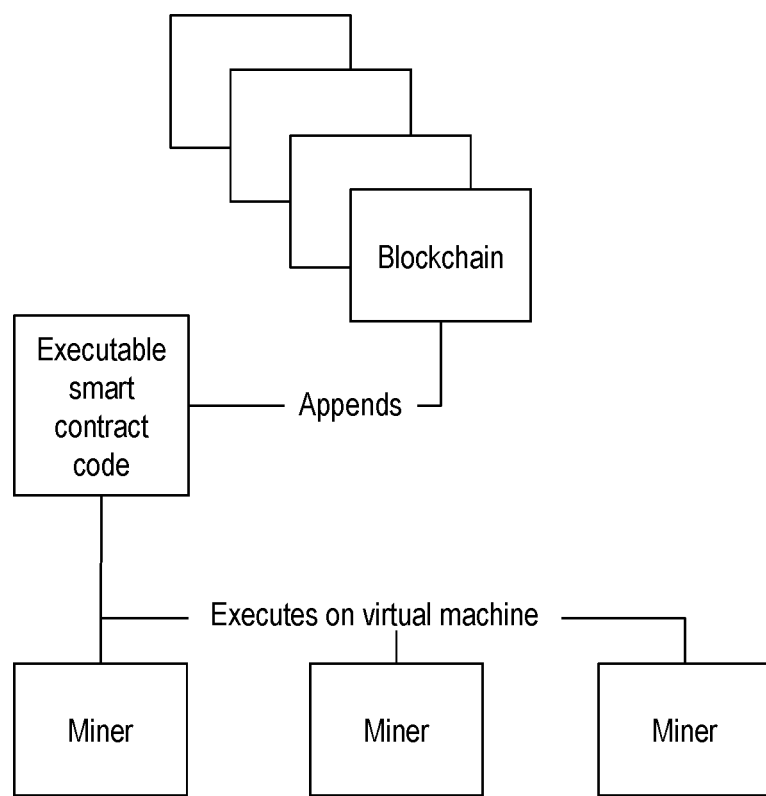
FIG. 24 is a block diagram illustrating a data structure of a smart contract.

FIG. 24 is a block diagram illustrating a data structure of a smart contract. Smart contracts and dApps execute on an Ethereum virtual machine ("EVM"). The EVM is instantiated on available network nodes. Smart contracts and dApps are applications that execute; thus, the processing power to do so must come from hardware somewhere. Nodes must volunteer their processors to execute these operations based on the premise of being paid for the work in Ethereum coins, referred to as Ether, measured in "gas." Gas is the name for a unit of work in the EVM. The price of gas can vary, often because the price of Ether varies, and is specified within the smart contract/dApp.

Every operation that can be performed by a transaction or contract on the Ethereum platform costs a certain number of gas, with operations that require more computational resources costing more gas than operations that require few computational resources. For example, at the time of writing, a multiplication instruction requires 5 gas, whereas an addition instruction requires 3 gas. Conversely, more complex instructions, such as a Keccak256 cryptographic hash requires 30 initial gas and 6 additional gas for every 256 bits of data hashed.

The purpose of gas is pay for the processing power of the network on execution of smart contracts at a reasonably steady rate. That there is a cost at all ensures that the work/processing being performed is useful and valuable to someone. Thus, the Ethereum strategy differs from a Bitcoin transaction fee, which is only dependent on the size in kilobytes of a transaction. As a result that Ethereum's gas costs are rooted in computations, even a short segment of code can result in a significant amount of processing performed. The use of gas further enforces incentivizes coders to generate efficient smart contracts/algorithms. Otherwise, the cost of execution may spiral out of control. Unrestricted, an exponential function may bankrupt a given user.

While operations in the EVM have a gas cost, gas has a "gas price" measured in ether. Transactions specify a given gas price in ether for each unit of gas. The fixing of price by transaction enables the market to decide the relationship between the price of ether and the cost of computing operations (as measured in gas). The total fee paid by a transaction is the gas used multiplied by gas price.

If a given transaction offers very little in terms of a gas price, that transaction will have low priority on the network. In some cases, the network miners may place a threshold on the gas price each is willing to execute/process for. If a given transaction is below that threshold for all miners, the process will never execute. Where a transaction does not include enough ether attached (e.g., because the transaction results in so much computational work that the gas costs exceed the attached ether) the used gas is still provided to the miners. When the gas runs out, the miner will stop processing the transaction, revert changes made, and append to the blockchain with a "failed transaction." Failed transactions may occur because the miners do not directly evaluate smart contracts for efficiency. Miners will merely execute code with an appropriate gas price attached. Whether the code executes to completion or stalls out due to excessive computational complexity is of no matter to the miner.

Where a high gas price is attached to a transaction, the transaction will be given priority. Miners will process transactions in order of economic value. Priority on the Ethereum blockchain works similarly as with the Bitcoin blockchain. Where a user attaches more ether to a given transaction than necessary, the excess amount is refunded back to that user after the transaction is executed/processed. Miners only charge for the work that is performed. A useful analogy regarding gas costs and price is that the gas price is similar to an hourly wage for the miner, whereas the gas cost is like a timesheet of work performed.

A type of smart contract that exists on the Ethereum blockchain are ERC-721 tokens (Ethereum Request for Comment-721). ERC-721 is a technical specification for non-fungible utility tokens (NFTs). An ERC-721 token is unique and can have different exclusivity to another token from the same smart contract, maybe due to age, rarity or visuals.

ERC-721 defines a common list of rules for Ethereum tokens to follow within the larger Ethereum ecosystem, allowing developers to accurately predict interaction between tokens. These rules include how the tokens are transferred between addresses and how data within each token is accessed. ERC-721 provides a framework for a means to build a token on top of a base cryptocurrency. In some embodiments herein, enhancements are built on top of the ERC-721 framework, though use of the ERC-721 technical specification is not inherently necessary and is applicable to circumstances where Ethereum is used as the base cryptocurrency.

NFTs have a uint256 variable called tokenId. Thus, for any ERC-721 contract, the pair contract address, uint256 tokenId must be globally unique. That said, a given dApp can have a "converter" that uses the tokenId as input and outputs an image.

Disclosure on token protocols has focused on Ethereum. As applicable in this disclosure, this is a base cryptocurrency. Other base cryptocurrencies exist now and in the future. This disclosure is not limited to application on specifically the Bitcoin or Ethereum blockchains.

Figure 25:
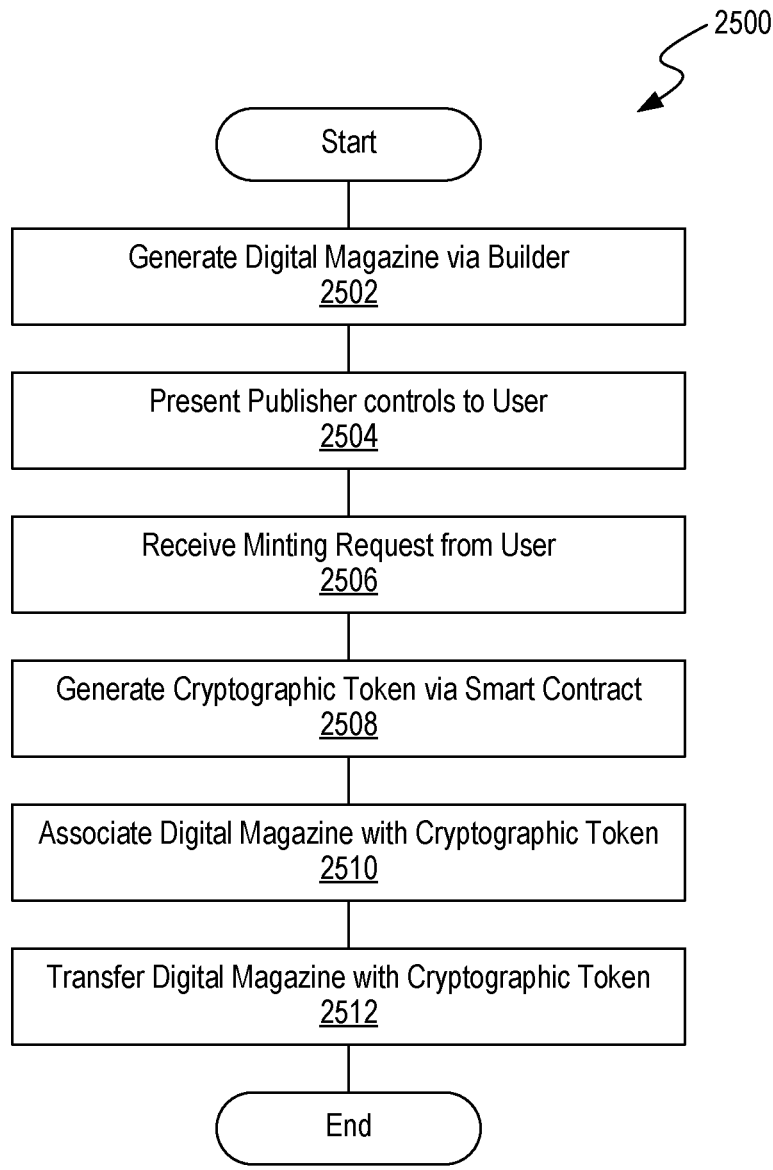
FIG. 25 is a flowchart that illustrates minting a given digital magazine into a cryptographic token.

FIG. 25 is a flowchart that illustrates minting a given digital magazine into a cryptographic token. In step 2502, the builder generates a digital magazine. Digital magazine generation occurs through any of the processes described herein. In step 2504, a user is presented a GUI for publisher controls. The publisher controls enable the user to set a number of means of publication for their digital magazine. Within the publisher controls is a command to "mint" the digital magazine as an NFT.

In step 2506, the platform receives a user command to "mint" the digital magazine. In step 2508, in response to the request to mint, the platform generates a cryptographic token using a smart contract associated with the digital magazine platform. That cryptographic token is associated with a cryptographic wallet of the user that generated the digital magazine. The cryptographic token is transferable to any cryptographic wallet, however the art assets used by the digital magazine are connected to the specific smart contract/dApp that minted the token.

In step 2510, the smart contract associates the visual representation of the digital magazine with the cryptographic token. The dApp includes user interface associated with the viewer platform and when executing the dApp, the user may view and transfer their digital magazines. In some embodiments, the digital magazine is still editable in the builder platform despite being "minted" as an NFT. Editing controls are held by the owner of the NFT. The cryptographic elements of the NFT do not change, but the visual representation within the dApp of the digital magazine as associated to the cryptographic elements of the NFT do allow for change. In other embodiments, once minted, the appearance of the digital magazine is locked.

In step 2512, the original user transfers their cryptographic token associated with the digital magazine to another user. In transferring, the digital magazine leaves the first user's publishing platform controls and instead is shifted to the new user's publisher interface. In some embodiments, edit controls for the digital magazine also are transferred to the new user.

Figure 26:
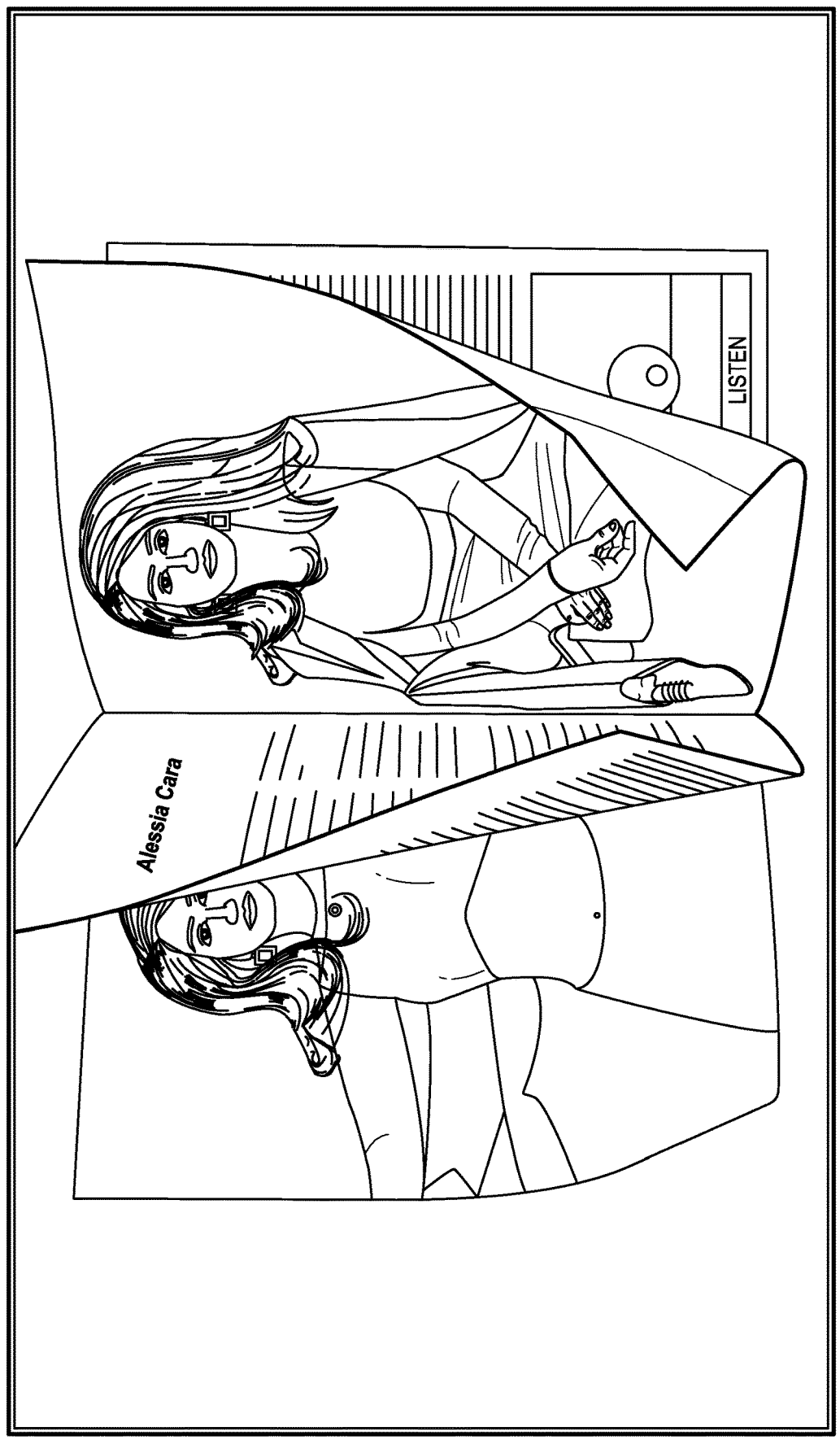
FIG. 26 is a screenshot of a digital magazine movie.

FIG. 26 is a screenshot of a digital magazine movie. An additional publisher control is to generate a movie or video of a given digital magazine. The magazine movie effectively displays the magazine or portions thereof very quickly and enables a user to promote their digital magazine through short form social media content. Within the publisher controls, a user is enabled to request generation of a magazine movie. The publisher control then presents controls to select which pages of the magazine are to be included in the movie.

Once pages are selected, the platform generates an animation using those pages. The animation quickly flips through the pages as if each was a page in a physical real magazine. The speed of the page flipping is at a pace which enables a human eye to capture highlights but not to capture significant text content. The video is hosted on the platform and is downloadable.

The downloaded content may be uploaded to other platforms, or alternatively the hosted version of the video may be linked in other platforms.

Computer System

Figure 27:
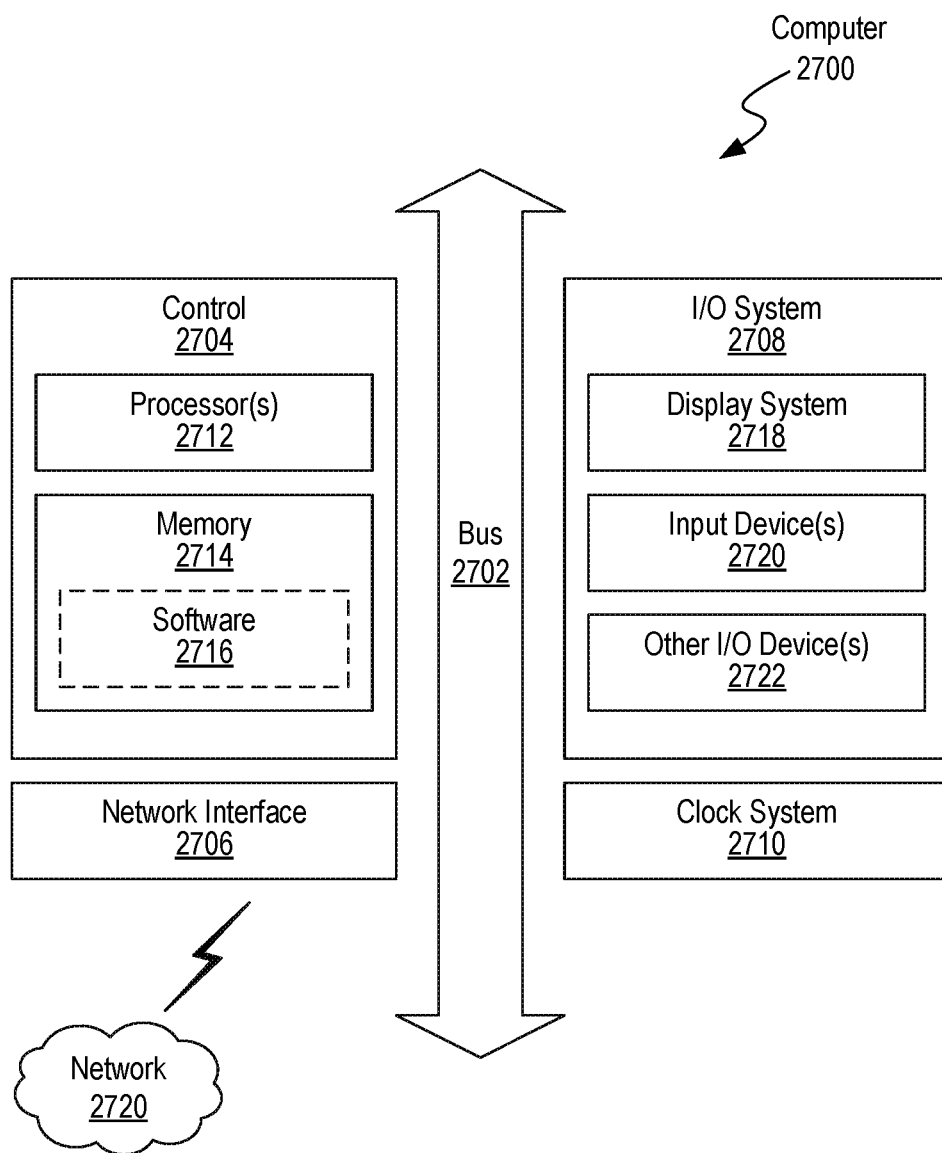
FIG. 27 shows a diagrammatic representation of a machine in the example form of a computer system within which a set of instructions for causing the machine to perform one or more of the methodologies discussed herein may be executed.

FIG. 27 is a block diagram of a computer 2700 operable to implement the disclosed technology according to some embodiments of the present disclosure. The computer 2700 may be a generic computer or specifically designed to carry out features of translation system 20. For example, the computer 2700 may be a system-on-chip (SOC), a single-board computer (SBC) system, a desktop or laptop computer, a kiosk, a mainframe, a mesh of computer systems, a handheld mobile device, or combinations thereof.

The computer 2700 may be a standalone device or part of a distributed system that spans multiple networks, locations, machines, or combinations thereof. In some embodiments, the computer 2700 operates as a server computer or a client device in a client-server network environment, or as a peer machine in a peer-to-peer system. In some embodiments, the computer 2700 may perform one or more steps of the disclosed embodiments in real time, near real time, offline, by batch processing, or combinations thereof.

As shown in FIG. 27, the computer 2700 includes a bus 2702 that is operable to transfer data between hardware components. These components include a control 2704 (e.g., processing system), a network interface 2706, an input/output (I/O) system 2708, and a clock system 2710. The computer 2700 may include other components that are not shown nor further discussed for the sake of brevity. One who has ordinary skill in the art will understand elements of hardware and software that are included but not shown in FIG. 27.

The control 2704 includes one or more processors 2712 (e.g., central processing units (CPUs)), application-specific integrated circuits (ASICs), and/or field-programmable gate arrays (FPGAs), and memory 2714 (which may include software 2716). For example, the memory 2714 may include volatile memory, such as random-access memory (RAM), and/or non-volatile memory, such as read-only memory (ROM). The memory 2714 can be local, remote, or distributed.

A software program (e.g., software 2716), when referred to as "implemented in a computer-readable storage medium," includes computer-readable instructions stored in the memory (e.g., memory 2714). A processor (e.g., processor 2712) is "configured to execute a software program" when at least one value associated with the software program is stored in a register that is readable by the processor. In some embodiments, routines executed to implement the disclosed embodiments may be implemented as part of an operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computer 2700), which, when read and executed by at least one processor (e.g., processor 2712), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 2714).

The network interface 2706 may include a modem or other interfaces (not shown) for coupling the computer 2700 to other computers over the network 2720. The I/O system 2708 may operate to control various I/O devices, including peripheral devices, such as a display system 2718 (e.g., a monitor or touch-sensitive display) and one or more input devices 2720 (e.g., a keyboard and/or pointing device). Other I/O devices 2722 may include, for example, a disk drive, printer, scanner, or the like. Lastly, the clock system 2710 controls a timer for use by the disclosed embodiments.

Operation of a memory device (e.g., memory 2724), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control it is to be understood that embodiments may include performing operations and using storage with cloud computing. For the purposes of discussion herein, cloud computing may mean executing algorithms on any network that is accessible by Internet-enabled or network-enabled devices, servers, or clients and that do not require complex hardware configurations, e.g., requiring cables and complex software configurations, e.g., requiring a consultant to install. For example, embodiments may provide one or more cloud computing solutions that enable users, e.g., users on the go, to access real-time video delivery on such Internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

The invention claimed is:

1. A method comprising:
displaying, to a first user, a first user interface of a digital magazine layout platform that enables users to design a digital layout of digital magazine documents including a plurality of templates and art controls, wherein a digital magazine document includes a plurality of flippable pages including content;
displaying, to the first user, a second user interface of a digital magazine publisher platform that includes controls that cause a distributed application to attach the digital layout of the digital magazine document designed by the first user to a cryptographic token, wherein the cryptographic token is transferrable to a second user;
receiving, by the digital magazine publisher platform, user input causing a current digital layout to become published and viewable on the digital magazine layout platform;
fixing an element of the digital layout to a blockchain data structure; and
generating a magazine flip-through animation of selected pages of the digital layout, the magazine flip-through animation.

2. The method of claim 1, wherein the first user interface includes a rip control that enables the first user to make a copy of a page of a first digital magazine document that was viewed on the digital magazine layout platform and subsequently insert that page into a draft digital magazine document via the digital magazine publisher platform.

3. The method of claim 1, wherein the first user interface includes a rip control that enables the first user to make a copy of a content item positioned on a first page of a first digital magazine document that was viewed on the digital magazine layout platform and subsequently insert that content item into a draft digital magazine document via the digital magazine publisher platform.

4. The method of claim 1, wherein the first user interface enables modification of the digital layout of the digital magazine after the digital layout has been attached to the cryptographic token.

5. The method of claim 1, wherein the cryptographic token is governed according to ERC-721.

6. The method of claim 1, wherein the digital magazine layout platform includes interface controls that cause partial shifts between the plurality of flippable pages of a first digital magazine document via partial cursor dragging.

7. A system comprising:
a processor;
a non-transitory computer-readable medium having stored thereon instructions that, when executed by the processor, cause the processor to perform operations including:
display, to a first user, a first user interface of a digital magazine layout platform that enables users to design a digital layout of digital magazine documents including a plurality of templates and art controls, wherein a digital magazine document includes a plurality of flippable pages including content;
display, to the first user, a second user interface of a digital magazine publisher platform that includes controls that cause a distributed application to attach the digital layout of the digital magazine document designed by the first user to a cryptographic token, wherein the cryptographic token is transferrable to a second user;
receive, by the digital magazine publisher platform, user input causing a current digital layout to become published and viewable on the digital magazine layout platform;
fix an element of the digital layout to a blockchain data structure; and
generate a magazine flip-through animation of selected pages of the digital layout, the magazine flip-through animation.

8. The system of claim 7, wherein the first user interface includes a rip control that enables the first user to make a copy of a page of a first digital magazine document that was viewed on a digital magazine viewer platform and subsequently insert that page into a draft digital magazine document via the digital magazine publisher platform.

9. The system of claim 7, wherein the first user interface includes a rip control that enables the first user to make a copy of a content item positioned on a first page of a first digital magazine document that was viewed on the digital magazine layout platform and subsequently insert that content item into a draft digital magazine document via the digital magazine publisher platform.

10. The system of claim 7, wherein the first user interface enables modification of the digital layout of the digital magazine after the digital layout has been attached to the cryptographic token.

11. The system of claim 7, wherein the cryptographic token is governed according to ERC-721.

12. The system of claim 7, wherein the digital magazine layout platform includes interface controls that cause partial shifts between the plurality of flippable pages of a first digital magazine document via partial cursor dragging.

13. A method comprising:
displaying, to a user, a first user interface of a digital magazine publishing platform that enables users to design a digital layout of digital magazine documents including a plurality of templates and art controls, wherein a digital magazine document includes a plurality of flippable pages including content;
displaying, to the user, a second user interface of a digital magazine viewer platform that enables users to browse the digital magazine documents via flipping digital pages;
receiving, by the digital magazine publishing platform, user input causing a current digital magazine draft to become published and viewable on the digital magazine viewer platform;
fixing an element of the published digital magazine draft to a blockchain data structure; and
generating a magazine flip-through animation of selected pages of the digital layout, the flip-through animation.

14. The method of claim 13, wherein the element of the published digital magazine draft fixed to the blockchain data structure is governed according to ERC-721.

15. The method of claim 13, wherein the second user interface includes a rip control that enables the user to make a copy of a page of a first digital magazine document that was viewed on the digital magazine viewer platform and subsequently insert that page into a draft digital magazine document via the digital magazine publishing platform.

16. The method of claim 13, wherein the second user interface includes a rip control that enables the user to make a copy of a content item positioned on a first page of a first digital magazine document that was viewed on the digital magazine viewer platform and subsequently insert that content item into a draft digital magazine document via the digital magazine publishing platform.

17. The method of claim 13, wherein the first user interface enables modification of the digital layout of the digital magazine after the digital layout has been attached to a cryptographic token.

18. The method of claim 13, wherein the first user interface locks an appearance of the digital layout of the digital magazine after the digital layout has been attached to a cryptographic token.

\* \* \* \* \*